(12) United States Patent
Kim et al.

(10) Patent No.: US 9,189,564 B2
(45) Date of Patent: Nov. 17, 2015

(54) METHOD AND APPARATUS FOR PROVIDING USER INTERFACE FOR INTERNET SERVICE

(75) Inventors: Sang-Heon Kim, Gyeongsangbuk-do (KR); Jung-Se Oh, Daegu (KR); Doo-Yong Park, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 117 days.

(21) Appl. No.: 13/529,214

(22) Filed: Jun. 21, 2012

(65) Prior Publication Data

US 2013/0014019 A1 Jan. 10, 2013

(30) Foreign Application Priority Data

Jul. 4, 2011 (KR) ........................ 10-2011-0066166

(51) Int. Cl.
*G06F 3/048* (2013.01)
*G06F 17/30* (2006.01)
G06F 3/0488 (2013.01)
G06F 3/0485 (2013.01)

(52) U.S. Cl.
CPC ...... *G06F 17/30905* (2013.01); *G06F 3/04855* (2013.01); *G06F 3/04883* (2013.01)

(58) Field of Classification Search
CPC .......................... G06F 3/04855; G06F 3/04883
USPC ....................................................... 715/738
See application file for complete search history.

(56) References Cited

U.S. PATENT DOCUMENTS

| | | | |
|---|---|---|---|
| 7,509,585 B1 * | 3/2009 | Gauthier et al. ............. | 715/762 |
| 8,347,232 B1 * | 1/2013 | Prud'Hommeaux et al. . | 715/833 |
| 2008/0295008 A1 * | 11/2008 | Kujda et al. .................. | 715/764 |
| 2009/0282368 A1 * | 11/2009 | Lam et al. ..................... | 715/834 |
| 2009/0304304 A1 * | 12/2009 | Nakanishi et al. ............ | 382/305 |
| 2010/0235733 A1 * | 9/2010 | Drislane et al. ............... | 715/702 |
| 2011/0022957 A1 | 1/2011 | Lee | |
| 2011/0050594 A1 * | 3/2011 | Kim et al. ...................... | 345/173 |
| 2011/0310005 A1 * | 12/2011 | Chen et al. .................... | 345/156 |
| 2012/0084692 A1 * | 4/2012 | Bae .............................. | 715/769 |
| 2012/0185463 A1 * | 7/2012 | Lim .............................. | 707/722 |
| 2012/0240074 A1 * | 9/2012 | Migos et al. .................. | 715/776 |
| 2012/0266079 A1 * | 10/2012 | Lee et al. ...................... | 715/744 |

FOREIGN PATENT DOCUMENTS

JP 2010-134755 A 6/2010
KR 10-2010-0123356 A 11/2010

OTHER PUBLICATIONS

Apple Inc.; "iPhone User Guide for iOS 4.2 and 4.3 Software;" Apple User Guides; May 23, 2011; XP055048853.

* cited by examiner

*Primary Examiner* — Boris Pesin
*Assistant Examiner* — Justin Lee
(74) *Attorney, Agent, or Firm* — Cha & Reiter, LLC

(57) ABSTRACT

A method and apparatus providing a user interface for an Internet service are provided. The user interface providing apparatus displays an $n^{th}$ Web page including at least one hyperlink on a screen, senses a direction of a gesture, determines a hyperlink indicating one of a previous Web page and next Web page to a current Web page from among the at least one hyperlink based on the gesture direction, and displays a Web page indicated by the determined hyperlink on the screen.

17 Claims, 15 Drawing Sheets

210

211 — `<div class="paging">`

212
`<strong>1</strong><a href="http://news.search.naver.com/search.naver?ie=utf8&se=0&mobile=0&tx=&where=news&query=%EC%82%BC%EC%84%B1%EC%A0%84%EC%9E%90&sm=tab_pge&sort=0&photo=0&field=0&ds=&de=&sim=0&docid=&detail_and_query=&detail_not_query=&detail_or_query=&detail_udp_query=&start=11" onclick="return ogOtherCR(this, 'a=nws.paging&r=2&i=&u='+urlencode(urlexpand(this.href)));">2</a><a`

213 — `href="http://news.serach.naver.com/search.naver?ie=utf8&se=0&tx=&where=news&query=%EC%82%BC%EC%84%B1%EC%A0%84%EC%9E%90&sm=tab_pge&sort=0&photo=0&field=0&reporter_article=&pd=0&ds=&de=&sim=0&docid=&detail_and_query=&detail_not_query=&detail_or_query=&detail_udp_query=&start=21" onclick="return ogOtherCR(this, 'a=nws.paging&r=3&i=&u='+urlencode(urlexpand(this.href)));">3</a><a`

214 — `href="http://news.serach.naver.com/search.naver?ie=utf8&se=0&tx=&where=news&query=%EC%82%BC%EC%84%B1%EC%A0%84%EC%9E%90&sm=tab_pge&sort=0&photo=0&field=0&reporter_article=&pd=0&ds=&de=&sim=0&docid=&detail_and_query=&detail_not_query=&detail_or_query=&detail_udp_query=&start=31" onclick="return ogOtherCR(this, 'a=nws.paging&r=4&i=&u='+urlencode(urlexpand(this.href)));">4</a><a`

215 — `href="http://news.serach.naver.com/search.naver?ie=utf8&se=0&tx=&where=news&query=%EC%82%BC%EC%84%B1%EC%A0%84%EC%9E%90&sm=tab_pge&sort=0&photo=0&field=0&reporter_article=&pd=0&ds=&de=&sim=0&docid=&detail_and_query=&detail_not_query=&detail_or_query=&detail_udp_query=&start=41" onclick="return ogOtherCR(this, 'a=nws.paging&r=5&i=&u='+urlencode(urlexpand(this.href)));">5</a><a`

216 — `href="http://news.serach.naver.com/search.naver?ie=utf8&se=0&tx=&where=news&query=%EC%82%BC%EC%84%B1%EC%A0%84%EC%9E%90&sm=tab_pge&sort=0&photo=0&field=0&reporter_article=&pd=0&ds=&de=&sim=0&docid=&detail_and_query=&detail_not_query=&detail_or_query=&detail_udp_query=&start=51" onclick="return ogOtherCR(this, 'a=nws.paging&r=6&i=&u='+urlencode(urlexpand(this.href)));">6</a><a`

217 — `href="http://news.serach.naver.com/search.naver?ie=utf8&se=0&tx=&where=news&query=%EC%82%BC%EC%84%B1%EC%A0%84%EC%9E%90&sm=tab_pge&sort=0&photo=0&field=0&reporter_article=&pd=0&ds=&de=&sim=0&docid=`

<div class="pg">  ~ 412
<a href="javascript:N.prev();" class="pv" onclick="nclk(this,'nws.back'  ' , ');"><img src=http://static.naver.net/e.gif width="38" height="27" alt="before" /><span class="nc">before</span></a>
<ul class="pgd" id="news_status">
<li><img src="http://static.naver.net/e.gif" width="9" height="9" alt="1(present page)" class="on" /><span class="nc">1(present page)</span></li>
<li><img src="http://static.naver.net/e.gif" width="9" height="9" alt="2" /><span class="nc">2</span></li>
<li><img src="http://static.naver.net/e.gif" width="9" height="9" alt="3" /><span class="nc">3</span></li>
<li><img src="http://static.naver.net/e.gif" width="9" height="9" alt="4" /><span class="nc">4</span></li>
</ul>
<a href="javascript:N.prev();" class="nx" onclick="nclk(this,'nws.back'  ' , ');"><img src=http://static.naver.net/e.gif width="38" height="27" alt="next" /><span class="nc">next</span></a>
<div class="pr">
<a href="http://m.news.naver.com/home.nhn" onclick="nclk(this,'nws.more','',);">every news</a>
</div>
```

FIG.4

```
<ul class="lnb">
  <li id="lnb1" ><a href="http://www.samsungapps.com/topApps/topAppslist.as?categoryID=all">All</a></li>
  <li id="lnb2" ><a href="http://www.samsungapps.com/topApps/topAppslist.as?categoryID=G000011539"> Entertainment </a></li>
  <li id="lnb3" ><a href="http://www.samsungapps.com/topApps/topAppslist.as?categoryID=G000011540">Education/E-Book</a></li>
  <li id="lnb4" ><a href="http://www.samsungapps.com/topApps/topAppslist.as?categoryID=G000011541">Games</a></li>
  <li id="lnb5" ><a href="http://www.samsungapps.com/topApps/topAppslist.as?categoryID=G000011553">Health/Life</a></li>
  <li id="lnb6" ><a href="http://www.samsungapps.com/topApps/topAppslist.as?categoryID=G000011554">Music/Video</a></li>
  <li id="lnb7" ><a href="http://www.samsungapps.com/topApps/topAppslist.as?categoryID=G000011555">News</a></li>
  <li id="lnb8" ><a href="http://www.samsungapps.com/topApps/topAppslist.as?categoryID=G000011556">Navigation</a></li>
  <li id="lnb9" ><a href="http://www.samsungapps.com/topApps/topAppslist.as?categoryID=G000011557">Productivity</a></li>
  <li id="lnb10" ><a href="http://www.samsungapps.com/topApps/topAppslist.as?categoryID=G000011558">Reference</a></li>
  <li id="lnb11" ><a href="http://www.samsungapps.com/topApps/topAppslist.as?categoryID=G000011559">Social Networking</a></li>
  <li id="lnb12" ><a href="http://www.samsungapps.com/topApps/topAppslist.as?categoryID=G000011560">Thema</a></li>
  <li id="lnb13" ><a href="http://www.samsungapps.com/topApps/topAppslist.as?categoryID=G000011561">Utilities</a></li>
  <li id="lnb14" ><a href="http://www.samsungapps.com/topApps/topAppslist.as?categoryID=G000011537">Brand</a></li>
```

FIG.7

METHOD AND APPARATUS FOR PROVIDING USER INTERFACE FOR INTERNET SERVICE

CLAIM OF PRIORITY

This application claims, 35 U.S.C. §119(a), priority to, and the benefit of the earlier filing date of, that patent application filed in the Korean Intellectual Property Office on Jul. 4, 2011 and assigned Serial No. 10-2011-0066166, the contents of which are incorporated herein by reference.

BACKGROUND OF THE INVENTION

1. Field of the Invention

The present invention relates to a user interface, and more particularly, to a method and apparatus for providing a user interface based on information acquired from a Web page.

2. Description of the Related Art

A user interface is a technology that grants a user a temporary or continuous access to information so that communication can be conducted between the user and an object, a system, a device, or a program.

Users spend more and more time in searching for information through the Internet and surfing the Web and, hence, a good user interface heightens the user's experience on the Web. Most of Web pages in Web or Wireless Application Protocol (WAP) sites on the Internet include a paging interface. The paging interface includes an index indicating a current displayed Web page and an index hyperlinked to at least one other Web page. For example, most of various blogs and portal sites such as Google, Flicker, etc. include paging interfaces, wherein a hyperlink on a current page allows the user to view a second or subsequent page. In addition, the second or subsequent page may include further hyperlinks that allows the user to view even further Web pages.

FIG. 1 illustrates typical user interfaces of Web pages displayed on screens 110, 120 and 130 that include paging interfaces 112, 122 and 132, respectively. If a user wants to turn to Web page 2 from a current Web page, the user may need to touch the key indicated by the number 2 in the paging interface 112 displayed on the current Web page 110. When the paging interface 112 is small on the screen 110, as in a portable terminal, the user may need to zoom in in order to expand the interface 112 to be of sufficient size to click or tap on the object indicated by the number 2, 114, which represents a hyperlink to Web page 2 in the paging interface 112. If the current Web page is partially displayed on the screen 110, excluding the paging interface 112, the user may need to move the current Web page on the screen 110 by, for example, scrolling, so that the paging interface 112 may appear on the screen 110.

Similarly, with reference to screen 120, if the user wants to access a next Web page, the user may click or tap on an object 128 (i.e. index 2) next to an object 124 (index 1) indicating the current Web page in the paging interface 122. If the screen 120 is relatively small, as in the portable terminal, it is not easy to accurately click or tap on the object 128 with a finger or a pen. Thus the user may incorrectly select index 3 unintentionally instead of the index 2 (object 128).

With reference to screen 120, the user may access a next page by selecting a Next object 126. However, because of the small size of the field containing the term "next" the user may not precisely engage the "next" button.

In another user interface, screen 130, the user may click or tap on an object 138 to step to a previous page or on an object 136 to step to a next page in the paging interface 132 on the screen 130. Even when the user goes to their intended Web page using the object 136 or 138 on the screen, the user may need to take an additional action, such as shift or zoom-in, according to the position or size of the paging interface included in the current Web page. In case of an image device having a relatively large screen, such as a TV or a monitor, a Web page including a paging interface may be displayed and the image device may receive a user input signal through a remote controller or a keyboard. Herein, a time delay may occur in response to a user's request to move a cursor to an object included in the paging interface and select the object in order to switch to a particular Web page. Considering that users tend to search for intended Web pages in a short time by looking through titles, headings, etc. rather than attentively reading search results as is done in Google search, use of the conventional user interfaces may cause a time delay and a mistaken manipulation in the course of searching for and selecting an object connected to an intended hyperlink in a paging interface.

Accordingly, there exists a need for a user interface that reduces a time delay and user's manipulation mistakes in switching from a Web page displayed on a screen to another Web page and that effectively acquires a response to a page request.

SUMMARY OF THE INVENTION

An aspect of embodiments of the present invention is to address at least the problems and/or disadvantages and to provide at least the advantages described below. Accordingly, an aspect of embodiments of the present invention is to provide a method and apparatus for providing a user interface, which can reduce a time delay and a user's manipulation mistakes and allow for convenient paging manipulation.

Another aspect of embodiments of the present invention is to provide a method and apparatus for providing a user interface, which can switch a current Web page to a user-selected Web page fast and accurately.

In accordance with an embodiment of the present invention, there is provided a method for providing a user interface for an Internet service, in which paging information about an $n^{th}$ Web page displayed on a screen is stored, a direction of a gesture is sensed, and upon sensing the direction of the gesture, one of a previous page and a next (subsequent) page to the currently displayed $n^{th}$ Web page is displayed on the screen according to the paging information.

The gesture may include at least one of a touch gesture, a motion of a terminal including the screen, an input of a button mapped to a predetermined direction, and a signal carrying direction information.

The method may further include parsing the $n^{th}$ Web page received from a Web server to detect the paging information.

During the $n^{th}$ Web page parsing, it may be determined whether an Identifier (ID) of at least one of a class and a display attribute constitutes paging information in a source code of the $n^{th}$ Web page.

During the $n^{th}$ Web page parsing, it may be determined whether the $n^{th}$ Web page includes a first object and a second object, the first object being an index indicating the $n^{th}$ Web page and the second object being an index adjacent to the first object, linked to a first hyperlink indicating one of a previous page and a next page to the $n^{th}$ Web page, the $n^{th}$ Web page and at least one of the previous page and the next page to the $n^{th}$ Web page have the same domain, and the at least one of the previous page and the next page to the $n^{th}$ Web page includes a third object and a fourth object, the third object being an index indicating the at least one of the previous page and the next pages to the $n^{th}$ Web page and the fourth object being an index adjacent to the third object, linked to a second hyperlink indicating the $n^{th}$ Web page.

During the $n^{th}$ Web page parsing, if the first and second objects are text, it may be determined whether the first and second objects are different in up to two letters.

During the displaying of the $n^{th}$ Web page, if the gesture is a touch gesture, one of a previous Web page and a next Web page to the $n^{th}$ Web page away from the $n^{th}$ Web page may be displayed depending upon a number of fingers that have made the touch gesture.

The paging information may include at least one hyperlink indicating at least one of the previous page and next page to the displayed $n^{th}$ Web page.

The paging information may include mapping information indicating the at least one hyperlink corresponding to a gesture direction.

If the gesture direction is a left or right direction, the mapping information may indicate mapping between the left direction and a hyperlink indicating an $(n+1)^{th}$ Web page and mapping between the right direction and a hyperlink indicating an $(n-1)^{th}$ Web page. If the gesture direction is an upward or downward direction, the mapping information may indicate mapping between the upward direction and a hyperlink indicating an $(n+1)^{th}$ Web page (i.e., a next page) and mapping between the downward direction and a hyperlink indicating an $(n-1)^{th}$ Web page (i.e., a previous page).

The paging information may be generated according to an arrangement sequence of first and second objects on the screen, the first object may be an index indicating the $n^{th}$ Web page, and the second object may be an index linked to a hyperlink indicating the one of the previous Web page and the next Web page to the $n^{th}$ Web page.

During the gesture direction sensing, if the gesture is a touch gesture, the direction of the gesture may be sensed irrespective of a region of an object linked to the at least one hyperlink in a region in which the $n^{th}$ Web page is displayed.

In accordance with another embodiment of the present invention, there is provided an apparatus for providing a user interface for an Internet service, in which a memory stores paging information about an $n^{th}$ Web page displayed on a screen, and a controller senses a direction of a gesture and, upon sensing the direction of the gesture, displays one of a previous page and a next page to the currently displayed $n^{th}$ Web page on the screen according to the paging information.

The gesture may include at least one of a touch gesture, a motion of a terminal including the screen, an input of a button mapped to a predetermined direction, and a signal carrying direction information.

The controller may parse the $n^{th}$ Web page received from a Web server to detect the paging information.

The controller may determine whether an ID of at least one of a class and a display attribute is paging information in a source code of the $n^{th}$ Web page.

The controller may determine whether the $n^{th}$ Web page includes a first object and a second object, the first object being an index indicating the $n^{th}$ Web page and the second object being an index adjacent to the first object, linked to a first hyperlink indicating one of a previous page and a next page to the $n^{th}$ Web page, the $n^{th}$ Web page and at least one of the previous page and the next page to the $n^{th}$ Web page have the same domain, and the at least one of the previous page and the next page to the $n^{th}$ Web page includes a third object and a fourth object, the third object being an index indicating the at least one of the previous page and the next page to the $n^{th}$ Web page and the fourth object being an index adjacent to the third object, linked to a second hyperlink indicating the $n^{th}$ Web page.

If the first and second objects are text, the controller may determine whether the first and second objects are different in up to two letters.

The apparatus may further include a sensor unit for sensing the gesture and transmitting data of the sensed gesture to the controller so that the controller determines the direction of the gesture, and the sensor unit may include at least one of a touch sensor, a sensor for sensing an input of a button, a motion sensor, and a module for receiving a signal carrying direction information.

The paging information may include at least one hyperlink indicating at least one of the previous page and the next page to the displayed $n^{th}$ Web page.

The paging information may include mapping information indicating the at least one hyperlink corresponding to the gesture direction.

The paging information may be generated according to an arrangement sequence of first and second objects on the screen, the first object may be an index indicating the $n^{th}$ Web page, and the second object may be an index linked to a hyperlink indicating the one of the previous Web page and the next Web page to the $n^{th}$ Web page.

If the gesture direction is a left or right direction, the mapping information may indicate mapping between the left direction and a hyperlink indicating a next (i.e., $(n+1)^{th}$)Web page and mapping between the right direction and a hyperlink indicating a previous (i.e., $(n-1)^{th}$)Web page. If the gesture direction is an upward or downward direction, the mapping information may indicate mapping between the upward direction and a hyperlink indicating an $(n+1)^{th}$ Web page and mapping between the downward direction and a hyperlink may indicate an $(n-1)^{th}$ Web page. As would be appreciated the direction, left, right, upward and downward for showing next and/previous Web pages is selected as a matter of an example to describe the invention claimed. However, it would be within the knowledge to those skilled in the art to alter the gesture/web page display without altering the scope of the invention.

If the gesture is a touch gesture, the controller may sense the direction of the gesture irrespective of a region of an object linked to the at least one hyperlink in a region in which the $n^{th}$ Web page is displayed.

In accordance with another embodiment of the present invention, there is provided a method for providing a user interface for an Internet service, in which an $n^{th}$ Web page including at least one hyperlink is displayed on a screen, a direction of a gesture is sensed, and upon sensing the direction of the gesture, a hyperlink indicating one of a previous page and a next page to the $n^{th}$ Web page is determined from among the at least one hyperlink on the screen according to the gesture direction and a Web page indicated by the determined hyperlink is displayed on the screen.

In accordance with another embodiment of the present invention, there is provided an apparatus for providing a user interface for an Internet service, in which a controller controls display of an $n^{th}$ Web page including at least one hyperlink on a screen and senses a direction of a gesture. Upon sensing the direction of the gesture, the controller determines a hyperlink indicating one of a previous page and a next page to the $n^{th}$ Web page from among the at least one hyperlink on the screen according to the gesture direction and controls display of a Web page on the screen indicated by the determined hyperlink.

In accordance with another embodiment of the present invention, there is provided a method for providing a user interface for an Internet service, in which an $n^{th}$ Web page including a first object representing an index of the $n^{th}$ Web page and a second object linked to a hyperlink indicating one of a previous Web page and a next Web page to the $n^{th}$ Web page is displayed on a screen, a direction of a gesture is sensed, and upon sensing the direction of the gesture, a hyperlink is determined according to an arrangement sequence of the first and second objects and the direction of the gesture and a Web page indicated by the determined hyperlink is displayed on the screen.

In accordance with another embodiment of the present invention, there is provided an apparatus for providing a user interface for an Internet service, in which a controller controls display of an $n^{th}$ Web page including a first object representing an index of the $n^{th}$ Web page and a second object linked to a hyperlink indicating one of a previous Web page and a next Web page to the $n^{th}$ Web page on a screen and sensing a direction of a gesture. Upon sensing the direction of the gesture, the controller determines a hyperlink according to an arrangement sequence of the first and second objects and the direction of the gesture and controls display on the screen of a Web page indicated by the determined hyperlink.

In accordance with another embodiment of the present invention, there is provided a method for providing a user interface for an Internet service, in which an $n^{th}$ Web page including a first object representing an index of the $n^{th}$ Web page and at least one object linked to a hyperlink is displayed on a screen, a touch gesture is received on the screen, and when a movement trace of the touch gesture is overlapped with at least a part of a region of the first object, a hyperlink linked to a last object of the at least one object is determined, the last object being an object having at least a part overlapped last with the movement trace of the touch gesture in a time domain, and a Web page indicated by the determined hyperlink is displayed on the screen.

In accordance with another embodiment of the present invention, there is provided an apparatus for providing a user interface for an Internet service, in which a controller controls display of an $n^{th}$ Web page including a first object representing an index of the $n^{th}$ Web page and at least one object linked to a hyperlink on a screen, and a sensor receives a touch gesture on the screen. When a movement trace of the touch gesture is overlapped with at least a part of a region of the first object, the controller determines a hyperlink linked to a last object of the at least one object, the last object being an object having at least a part overlapped last with the movement trace of the touch gesture in a time domain, and controls display of a Web page indicated by the determined hyperlink on the screen.

In accordance with a further embodiment of the present invention, there is provided a system for providing a user interface for an Internet service, including a user interface providing apparatus for controlling display of an $n^{th}$ Web page including at least one hyperlink on a screen, and a remote controller for transmitting a signal carrying direction information to the user interface providing apparatus. The user interface providing apparatus senses a direction of a gesture from the direction information, determines a hyperlink indicating one of a previous Web page and a next Web page to the $n^{th}$ Web page from among the at least one hyperlink based on the gesture direction, and controls display on the screen of a Web page indicated by the determined hyperlink.

BRIEF DESCRIPTION OF THE DRAWINGS

The above features and advantages of certain embodiments of the present invention will be more apparent from the following detailed description taken in conjunction with the accompanying drawings, in which:

FIG. 2 illustrates an exemplary source code of a Web page, for use in the present invention;

FIG. 4 illustrates another exemplary source code of a Web page for use in the present invention;

FIG. 7 illustrates an exemplary source code of the paging interface illustrated in FIG. 6, for use in the present invention;

Throughout the drawings, the same drawing reference numerals will be understood to refer to the same elements, features and structures.

DETAILED DESCRIPTION OF THE INVENTION

A detailed description will be given of a method for implementing and using the present invention. The term "gesture" may refer to user input information including a touch gesture, movement of a User Interface (UI) providing apparatus, movement of a terminal having a UI providing apparatus, input of a button (or key) mapped to a predetermined direction, or a signal carrying direction information. It is to be understood that a touch gesture made with at least one finger such as a thumb or an index finger includes flicking or dragging. In addition, a touch gesture may be made with a stylus or a pen that is flicked or dragged along a screen.

In accordance with an embodiment of the present invention, a UI providing apparatus may be used in electronic devices including a TV, a computer, a cellular phone, a smart phone, a kiosk, a printer, a scanner, an e-book reader, and a multimedia player, touch screen- or motion sensor-equipped devices that can be used in interaction with a computer and a communication device, a touch screen controller, or a remote controller. In addition, the UI providing apparatus may be used in devices capable of displaying Web pages or devices that control these devices. That is, the present invention is not limited to any specific device type in which a UI providing apparatus is used.

A Web page may display multimedia data in conformance to a Web or Wireless Application Protocol (WAP) protocol, (i.e., an Internet protocol). The Web page may include a paging interface. The paging interface may include a hyperlink linking to another Web page so that the Web page is switched to another Web page.

Figure 1:
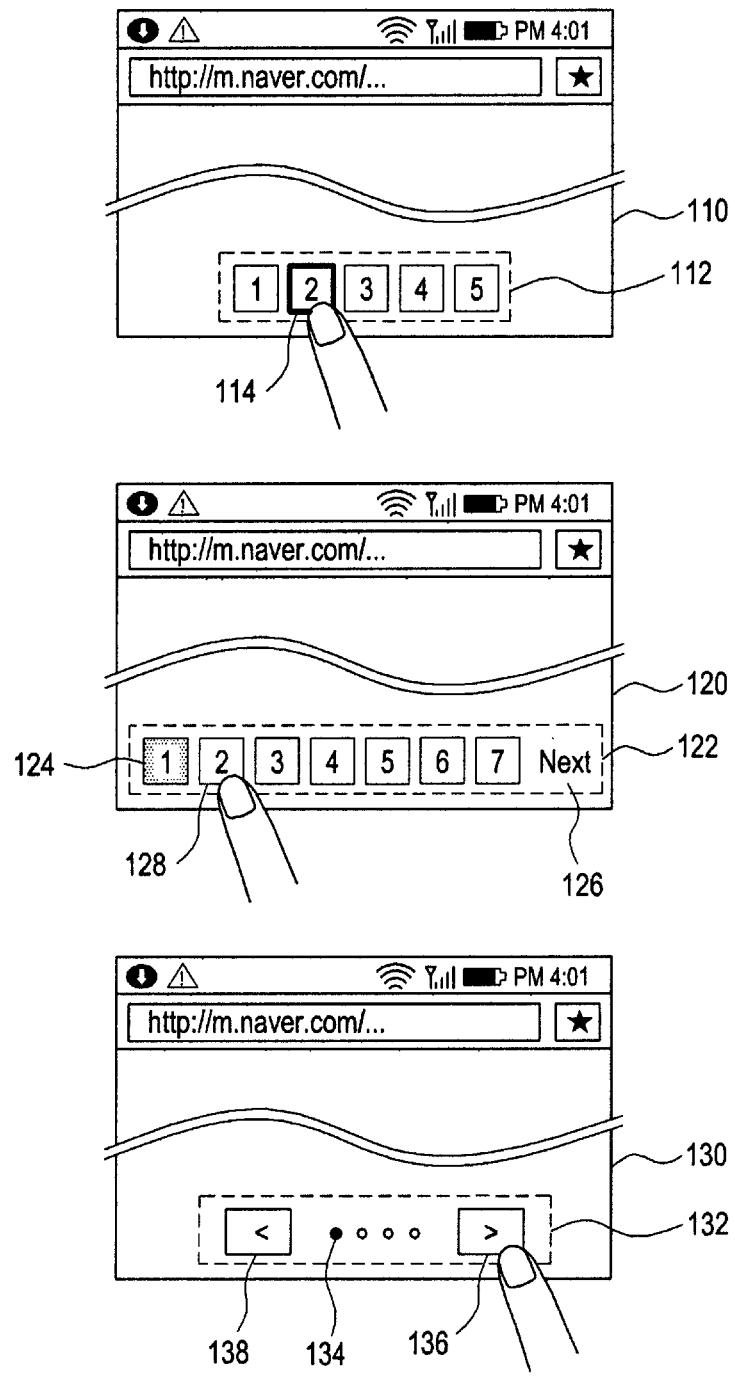
FIG. 1 is a view illustrating taps or clicks in paging interfaces.
Figure 3:
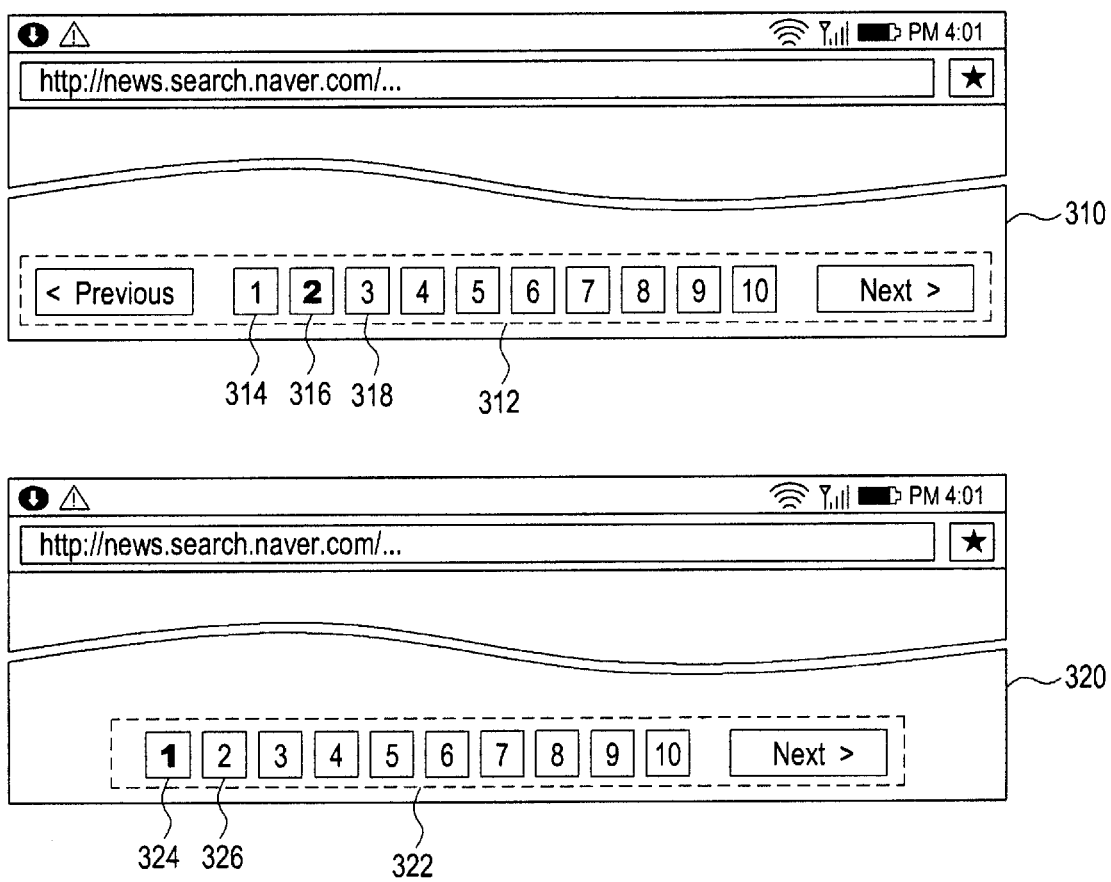
FIG. 3 illustrates exemplary features of a paging interface included in a Web page, for use in the present invention.

For example, a paging interface may be detected from a Web page written in a Web standard coding scheme such as Hyper Text Markup Language (HTML), javascript, Cascading Style Sheets (CSS), or Document Object Model (DOM). Referring to FIG. 3, an $n^{th}$ Web page may be received from a Web server and displayed on a screen 310. The $n^{th}$ Web page may include a paging interface 312. An object 316 may represent the current $n^{th}$ Web page, herein represented by the index 2. The object 316 may be a hyperlink means indicating the $n^{th}$ Web page. The object 316 may be adjacent to an object 314, which provides a hyperlink to a previous (i.e., $(n-1)^{th}$) Web page and an object 318, which provides a hyperlink to a next or subsequent (i.e., $(n+1)^{th}$) Web page in a predetermined order. A screen 320 may switch from the $n^{th}$ Web page to the $(n-1)^{th}$ Web page, corresponding to object 314, based on the direction of a gesture (not shown) according to a feature of the present invention.

The UI providing apparatus may display an $n^{th}$ Web page including at least one hyperlink. The UI providing apparatus may sense the direction of a gesture. Upon sensing the direction of the gesture, the UI providing apparatus may determine a hyperlink indicating one of a previous page and a next page to the $n^{th}$ Web page from among one or more hyperlinks according to the direction of the gesture and display a Web page indicated by the detected hyperlink.

In addition, the UI providing apparatus may display an $n^{th}$ Web page on a screen, which includes a first object being an index indicating the $n^{th}$ Web page and a second object linked to a hyperlink indicating one of a previous Web page and a next Web page to the $n^{th}$ Web page. The UI providing apparatus may sense the direction of a gesture. Upon sensing the direction of the gesture, the UI providing apparatus may determine a hyperlink according to the arrangement sequence of the first and second objects on the screen and the direction of the gesture and may display a Web page indicated by the determined hyperlink.

The UI providing apparatus may display an $n^{th}$ Web page including a first object representing the index of the $n^{th}$ Web page and at least one hyperlinked object on a screen. The UI providing apparatus may receive a gesture on the screen. If a movement trace of the gesture is overlapped with at least a part of a region of the first object, the UI providing apparatus may determine a hyperlink linked to a last of one or more objects (the last object being an object having at least a part overlapped with the movement trace of the gesture, last in the time domain) and may display a Web page on the screen indicated by the determined hyperlink (see FIG. 15, for example).

The UI providing apparatus may store paging information regarding an $n^{th}$ Web page displayed on a screen. The UI providing apparatus may sense the direction of a gesture. Upon sensing the direction of the gesture, the UI providing apparatus may display one of a previous Web page and a next Web page to the displayed $n^{th}$ Web page on the screen according to the paging information and the direction of the gesture.

Now, a detailed description will be given of a method for operating a UI providing apparatus for an Internet service according to an embodiment of the present invention, with reference to FIGS. 2 to 13. While gestures received at the UI providing apparatus may include a touch gesture, a motion of the UI providing apparatus, a motion of a terminal including the UI providing apparatus (or a screen), input of a button (or key) mapped to a predetermined direction, or a remote controller signal carrying direction information, the following description is given with the appreciation that the UI providing apparatus receives a touch gesture, by way of example. However, the operation of the UI providing apparatus described herein is applicable to the other types of inputs which have been discussed.

Figure 12:
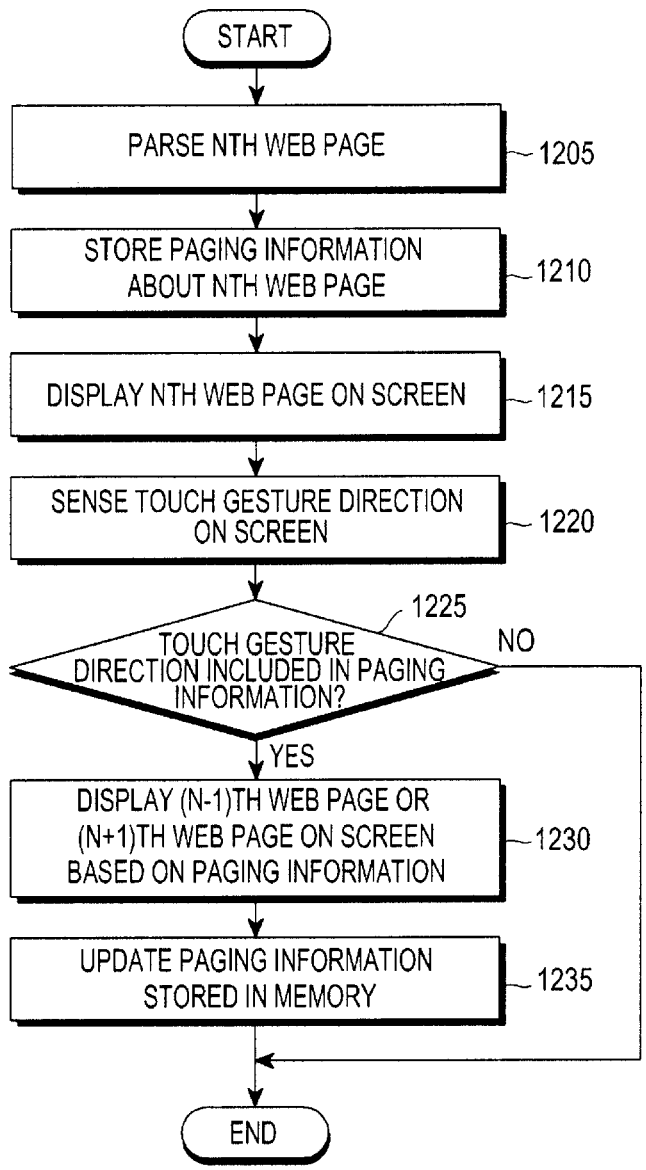
FIG. 12 is a flowchart illustrating a method for providing a user interface according to an embodiment of the present invention.
Figure 13:
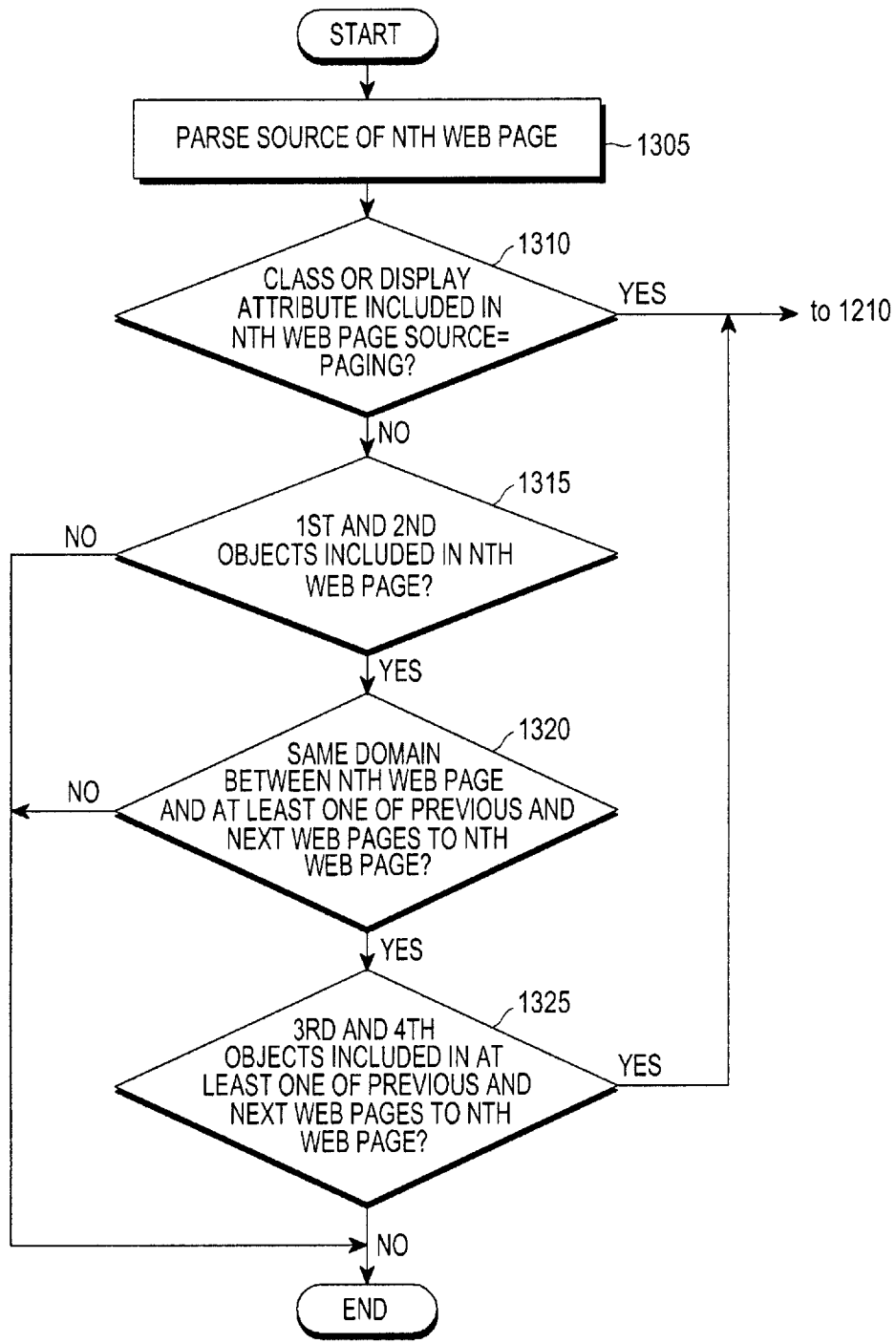
FIG. 13 is a detailed flowchart illustrating a step for analyzing a Web page in the method for providing a user interface according to an embodiment of the present invention.

Referring to FIG. 12, the UI providing apparatus may parse an $n^{th}$ Web page received from a Web server to detect paging information in the Web page in step 1205. FIG. 13 is a detailed flowchart illustrating step 1205.

Referring to FIG. 13, the UI providing apparatus may parse the source code of the $n^{th}$ Web page in step 1305.

In step 1310, the UI providing apparatus may determine whether the Identifier (ID) of a class or display attribute included in the source code of the $n^{th}$ Web page represents paging information, as a result of the source parsing. For example, FIG. 2 illustrates the source code 210 of an exemplary Web page. A code 211 included in the source code 210 indicates that the display class represents or includes paging information. Thus, the UI providing apparatus may determine that the display class represents paging information from the code 211 included in the $n^{th}$ Web page source 210. The UI providing apparatus may also detect a hyperlink indicating at least one of a previous and a next Web page to the $n^{th}$ Web page. For example, if an object representing the $n^{th}$ Web page is represented as index 2, the hyperlink indicating at least one of a previous or a next Web page to the $n^{th}$ Web page may be a hyperlink 212 linked to index 1 or a hyperlink 214 linked to index 3 according to the arranged sequence of objects. In addition, the UI providing apparatus may detect hyperlinks 212 to 217 associated with successively arranged indexes 1 to 10 representing a paging interface.

Figure 5:
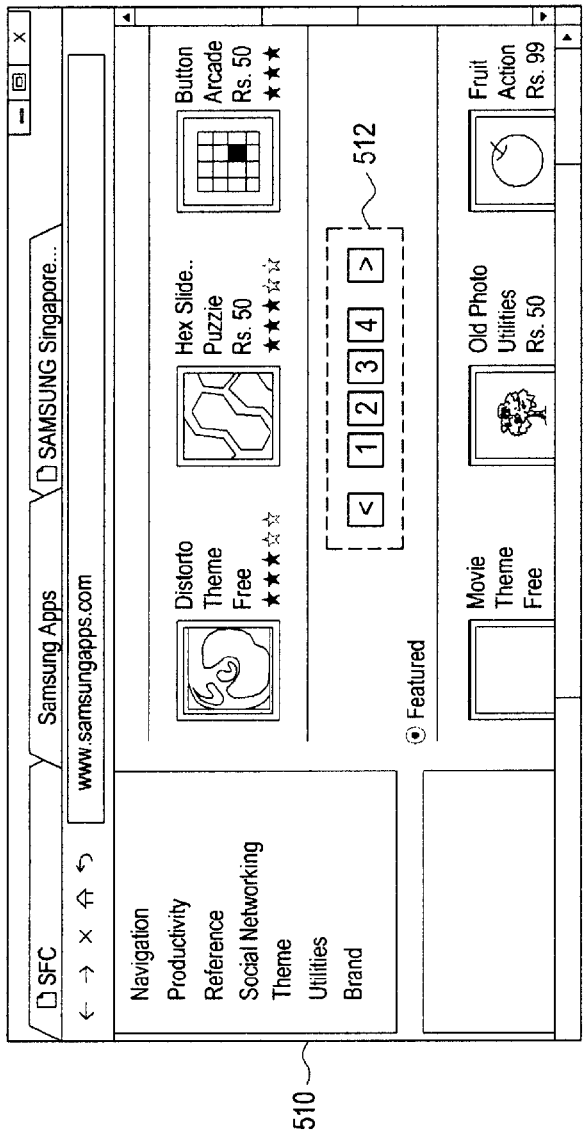
FIG. 5 illustrates an exemplary paging interface on a Web page and a source code of the paging interface, for use in the present invention.
Figure 6:
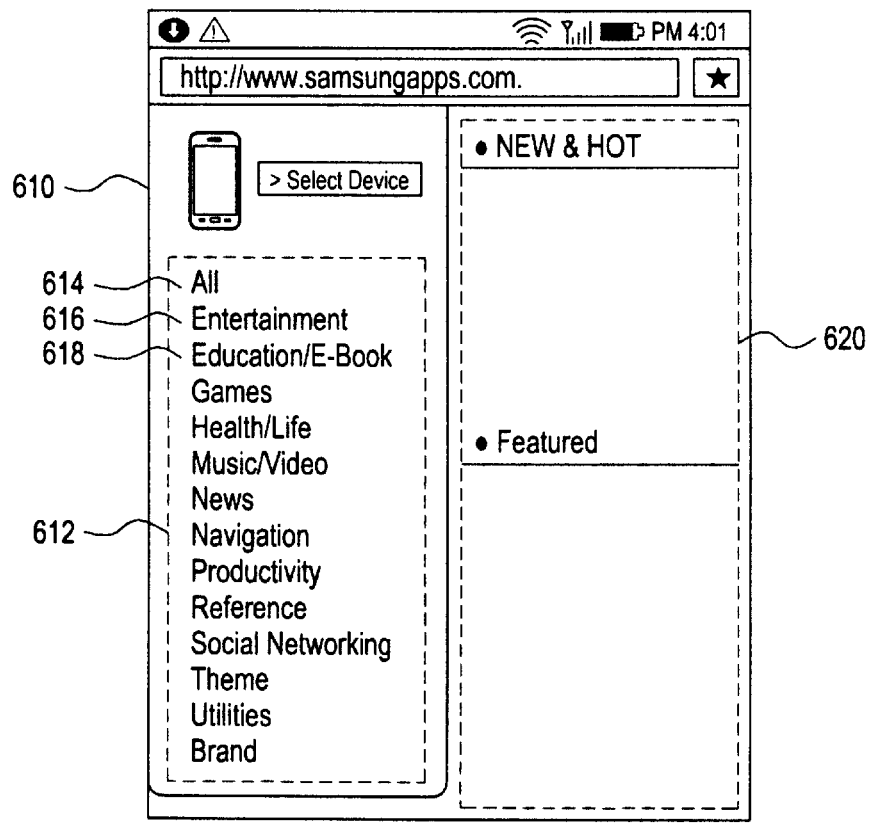
FIG. 6 illustrates another exemplary paging interface on a Web page, for use in the present invention.

Various paging interfaces and sources are available to Web pages. For example, an $n^{th}$ Web page source 410 may include a code 412 indicating paging information in FIG. 4. In FIG. 5, a source 520 of a paging interface 512 included in a Web page 510 displayed on a screen may include a code 522. The code 412 or the code 522 may indicate that the display class represents paging information.

If the code 412 or the code 522 is not included or does not indicate paging, the UI providing apparatus may determine that the display class does represent paging information by analyzing features such as an object indicating a Web page or a hyperlink layout in the source code 410 or the source code 520. For example, the source 410 or the source 520 may include a command requesting Web page switching in Java or Javascript, upon occurrence of an event of selecting an object. The UI providing apparatus may detect a command or the layout of objects displayed on a screen (or the arrangement order of objects) by parsing the source code of the Web page. The UI providing apparatus may determine whether the current Web page includes a paging interface based on the detected command or object layout and may determine a hyperlink linked to at least one of a previous and a next Web page to the current Web page.

While a paging interface has been described in the context of indexes and symbols according to one aspect of the present invention, the paging interface may include a Web page switching index, a menu, or a tab. For example, the UI providing apparatus may display a Web page on a screen 610 in FIG. 6. A menu 612 including a plurality of objects 614, 616 and 618 may be shown on the left-hand side of the screen 610, whereas at least a part of a Web page indicated by the object 614 is displayed on a right-hand area 620 of the screen 610. If the object 616 indicates an $n^{th}$ Web page, the object 614 may be hyperlinked to a previous (i.e., $(n-1)^{th}$) Web page or the object 618 may be hyperlinked to a next or subsequent (i.e., $(n+1)^{th}$) Web page. FIG. 7 illustrates an exemplary source 710 of the paging interface 612 illustrated in FIG. 6. Codes 714, 716, and 718 may describe the objects 614, 616 and 618, of FIG. 6, respectively. If the object 616 represents the current Web page, i.e., the $n^{th}$ Web page, the UI providing apparatus may determine a hyperlink indicating the $(n-1)^{th}$ Web page or a hyperlink indicating the $(n+1)^{th}$ Web page, after determining that the current Web page includes a paging interface.

Returning to FIG. 13, if the ID of the class or display attribute included in the $n^{th}$ Web page represents paging information in step 1310, the UI providing apparatus may proceed to step 1210 of FIG. 12.

To determine whether the $n^{th}$ Web page includes a paging interface, the UI providing apparatus may check the class or ID included in the source of the $n^{th}$ Web page in step 1310 and may determine whether the $n^{th}$ Web page includes a paging interface in steps 1315 to 1325. That is, if the ID of the class or display attribute included in the source code of the $n^{th}$ Web page is not paging or a class or ID indicating paging is not included in the source code of the $n^{th}$ Web page in step 310, the UI providing apparatus may proceed to step 1210 if the conditions described in steps 1315 to 1325 are satisfied.

In step 1315, the UI providing apparatus may determine whether the $n^{th}$ Web page includes first and second objects. The first object may be an index indicating the $n^{th}$ Web page and the second object may be an index linked to a first hyperlink indicating one of a previous Web page and a next Web page to the $n^{th}$ Web page, adjacent to the first object. For example, the first object may be the object 316 and the second object may be the object 314 or 318 in FIG. 3.

If the condition of step 1315, 1320, or 1325 is not satisfied, the operation of the UI providing apparatus according to one aspect of the present invention will end.

If the condition is satisfied in step 1315, the UI providing apparatus may determine whether the $n^{th}$ Web page and at least one of a previous Web page and a next Web page to the $n^{th}$ Web page have the same domain in step 1320. For example, a domain included in a Uniform Resource Locator (URL) indicating the position of the current page in the Web server or the hyperlink 213 of FIG. 2 indicating the current Web page and a domain included in the hyperlink 212 indicating the $(n-1)^{th}$ Web page or in the hyperlink 214 indicating the $(n+1)^{th}$ Web page may be the same, (e.g., "news.search, naver.com"). The URL may include at least a part of information between "<a href=" and the first subsequent ">" in the Web page source.

If the condition of step 1320 is satisfied, the UI providing apparatus may determine whether the at least one of a previous Web page and a next Web page to the $n^{th}$ Web page includes third and fourth objects in step 1325. The third object may be an index indicating the at least one of a previous Web page and a next Web page to the $n^{th}$ Web page and the fourth object may be an index linked to a second hyperlink indicating the $n^{th}$ Web page, adjacent to the third object. For example, the third and fourth objects may be objects 324 and 326, respectively in FIG. 3. The object 324 in paging interface 322 may represent the $(n-1)^{th}$ Web page. The screen 320 that displays the $(n-1)^{th}$ Web page may not be displayed to the user. For example, the UI providing apparatus may determine whether the $(n-1)^{th}$ Web page includes the third and fourth objects 324 and 326 by parsing one of a previous Web page and a next Web page to the $n^{th}$ Web page, the $(n-1)^{th}$ Web page (or data of the $(n-1)^{th}$ Web page) without displaying the $(n-1)^{th}$ Web page on the screen 320.

Steps 1315, 1320 and 1325 may be performed irrespective of the illustrated order. In addition, steps 1315, 1320 and 1325 may be implemented in a single step so that they are performed at the same time.

To determine whether the display class represents paging information, the UI providing apparatus may determine the first and second objects are different in up to two letters, if all conditions are satisfied in steps 1315, 1320 and 1325 and the first and second objects are text. For example, the first object may be the object 316 and the second object may be the object 314 or 318, in FIG. 3. Herein, the indexes represented by the first and second objects may be 2 and 1, respectively. When the adjacent objects are indexes 9 and 10, the UI providing apparatus may also determine whether the first and second objects are different in up to two letters. The operation of comparing or determining the numbers of the first and second objects may be omitted irrespective of whether the objects are text or not.

Referring to FIG. 12 again, the UI providing apparatus may store paging information about the $n^{th}$ Web page in step 1210. If the UI providing apparatus determines that the $n^{th}$ Web page includes a paging interface after parsing the source code of the $n^{th}$ Web page in step 1205, the UI providing apparatus may detect a hyperlink indicating at least one of a previous Web page and a next Web page to the $n^{th}$ Web page or position information (e.g. a bookmark or a URL) about the at least one of a previous Web page and a next Web page to the $n^{th}$ Web page in the source (or code) of the paging interface.

The paging information may include at least one hyperlink indicating at least one of a previous Web page and a next Web page to the $n^{th}$ Web page (or position information about the at least one previous or next page). The paging information may also include mapping information indicating at least one hyperlink corresponding to a direction of a gesture. Table 1 below illustrates exemplary paging information stored in a memory of the UI providing apparatus.

TABLE 1

| Gesture direction | Hyperlink (position information about Web page) |
|---|---|
| Left | URL of $(n + 1)^{th}$ Web page: "http://news.search.naver.com/search.naver?ie=..._query=&start=31" |
| Right | URL of $(n - 1)^{th}$ Web page: "http://news.search.naver.com/search.naver?ie=..._query=&start=11" |

If the current Web page is the $n^{th}$ Web page, a gesture in the left direction may correspond to a hyperlink indicating the $(n+1)^{th}$ page and a gesture in the right direction may correspond to a hyperlink indicating the $(n-1)^{th}$ page. In this exemplary case, when the object 316 indicates the $n^{th}$ page in FIG. 3, the UI providing apparatus may determine the hyperlink 214 indicating the $(n+1)^{th}$ page and the hyperlink 212 indicating the $(n-1)^{th}$ page in the source code 210 of the paging interface 312 illustrated in FIG. 2 and map the hyperlinks 214 and 212 to the gesture directions.

Table 2 below illustrates another example of paging information.

TABLE 2

| Gesture direction | Hyperlink (position information about Web page) |
|---|---|
| Up | URL of $(n + 1)^{th}$ Web page: "http://www.sansungapps.com/topApps/...categoryID=G000011540" |

TABLE 2-continued

| Gesture direction | Hyperlink (position information about Web page) |
| --- | --- |
| Down | URL of (n − 1)$^{th}$ Web page: "http://www.sansungapps.com/topApps/... categoryID=all" |

If the current Web page is the n$^{th}$ Web page, a gesture in an upward direction may correspond to a hyperlink indicating the (n+1)$^{th}$ page and a gesture in a downward direction may correspond to the hyperlink indicating the (n−1)$^{th}$ page. In this exemplary case, when the object 616 indicates the n$^{th}$ page in FIG. 6, the UI providing apparatus may detect the hyperlink 714 indicating the (n+1)$^{th}$ page and the hyperlink 712 indicating the (n−1)$^{th}$ page in the source 710 of the paging interface 612 illustrated in FIG. 7 and map the hyperlinks 714 and 712 to the gesture directions.

As noted from Table 1 or Table 2, the paging information includes sequence information about at least one hyperlink adjacent (i.e., in sequence) to the current Web page. The sequence information may specify the arrangement sequence of objects displayed on the screen. The reference of the sequence information may be determined to be the object representing the current Web page or an object serving as a reference according to a predetermined starting portion or direction on the screen. That is, the UI providing apparatus may generate the paging information (or the mapping information included in the paging information) based on the arrangement sequence of the first and second objects on the screen. Herein, the first object may be the index of the current Web page and the second object may be an index linked to a hyperlink indicating at least one of a previous Web page and a next Web page to the current Web page, adjacent to the first object. The UI providing apparatus may detect the arrangement sequence of the first and second objects by parsing the source code of the Web page. Since the UI providing apparatus can configure the paging information by detecting information needed for an operation from the Web page, it can effectively operate without modifying the conventional Web (or WAP) protocol or the source code of the Web page.

The paging information may further specify how a Web page indicated by a hyperlink corresponding to a gesture direction is displayed, along with the hyperlink. When the gesture direction is sensed, the Web page may be displayed in a new window on the screen, may substitute for the existing page, or may be displayed in a part or a specific frame included in the Web page. The Web page display scheme may be detected from the code of the paging interface in the n$^{th}$ Web page source.

The paging information may include all hyperlinks included in the paging interface of the n$^{th}$ Web page with at least one of a previous Web page and a next Web page to the n$^{th}$ Web page.

The gesture may be a multi-touch gesture made with at least two fingers as well as a touch gesture made with a single finger (or an input device). The mapping information included in the paging information may specify a previous page or a next page apart from the n$^{th}$ Web page by a predetermined number of pages (or the first or last Web page) according to a gesture direction. Herein, the predetermined number of pages may be equal to the number of fingers that have made the touch gesture.

Referring to FIG. 12, the UI providing apparatus may display the current Web page received from the Web server, i.e. the n$^{th}$ Web page on the screen in step 1215. The n$^{th}$ Web page may correspond to the Web page being displayed on the screen. The UI providing apparatus may perform step 1215 irrespective of the sequence of steps 1205 and 1210 or a time at which each of steps 1205 and 1210 is performed.

In step 1220, the UI providing apparatus may sense a direction of a touch gesture on the screen. For example, the UI providing apparatus may sense the direction of a touch gesture 817 made by a user on an n$^{th}$ Web page 815 displayed on a screen 810 in FIG. 8. A touch gesture, including flicking or dragging, is performed in a directional manner. Flicking may include a swipe or a fling and dragging may include panning or scrolling. A region in which the UI providing apparatus senses the direction of a touch gesture may not be related to the region of an object linked to at least one hyperlink, i.e. the paging interface 812 or the region of the paging interface 812 in an area where the n$^{th}$ Web page is displayed. That is, the UI providing apparatus may receive the touch gesture 817 at any position of the Web page 815 displayed larger than the paging interface 812. Therefore, the user may omit an additional action to enlarge the region of the paging interface 812, for clicking (or tapping) on an object 816 or 818 adjacent to an object 814 representing the current Web page.

The UI providing apparatus may determine whether the direction of the touch gesture is included in the paging information in step 1225. For example, if the paging information stored in the memory of the UI providing apparatus is configured as illustrated in Table 1, the UI providing apparatus may determine whether the direction of the touch gesture is one of a left direction or a right direction (e.g., the touch gesture 817 of FIG. 8 or the touch gesture 917 of FIG. 9, respectively). If the paging information is configured as illustrated in Table 2, the UI providing apparatus may determine whether the direction of the touch gesture is one of an upward direction or a downward direction (e.g., touch gestures 1017 and 1117 illustrated in FIGS. 10 and 11, respectively,). On the other hand, in the absence of a sensed direction of the touch gesture in the paging information, the UI providing apparatus may end the operation for the Internet service or maintain the display of the current Web page.

In step 1230, the UI providing apparatus may determine a hyperlink indicating one of a previous Web page and a next Web page to the n$^{th}$ Web page according to the arrangement sequence of objects including the object representing the current Web page and the direction of the touch gesture and may display the Web page indicated by the determined hyperlink on the screen. In addition, the UI providing apparatus may display the previous (i.e., (n−1)$^{th}$) or next (i.e., (n+1)$^{th}$) Web page on the screen based on the paging information. For example, upon sensing the touch gesture 817 made in a left direction on the Web page 815 displayed on the screen 810 in FIG. 8, the UI providing apparatus may identify the hyperlink indicating the (n+1)$^{th}$ Web page mapped to the left-directional touch gesture 817 based on the paging information configuration illustrated in Table 1. The UI providing apparatus may substitute the next (i.e., (n+1)$^{th}$)Web page on the screen 820 for the n$^{th}$ Web page on the screen 810. An object 826 may be an index indicating the (n+1)$^{th}$ Web page and an object 824 may be an index linked to a hyperlink indicating the n$^{th}$ Web page on the screen 820.

Figure 9:
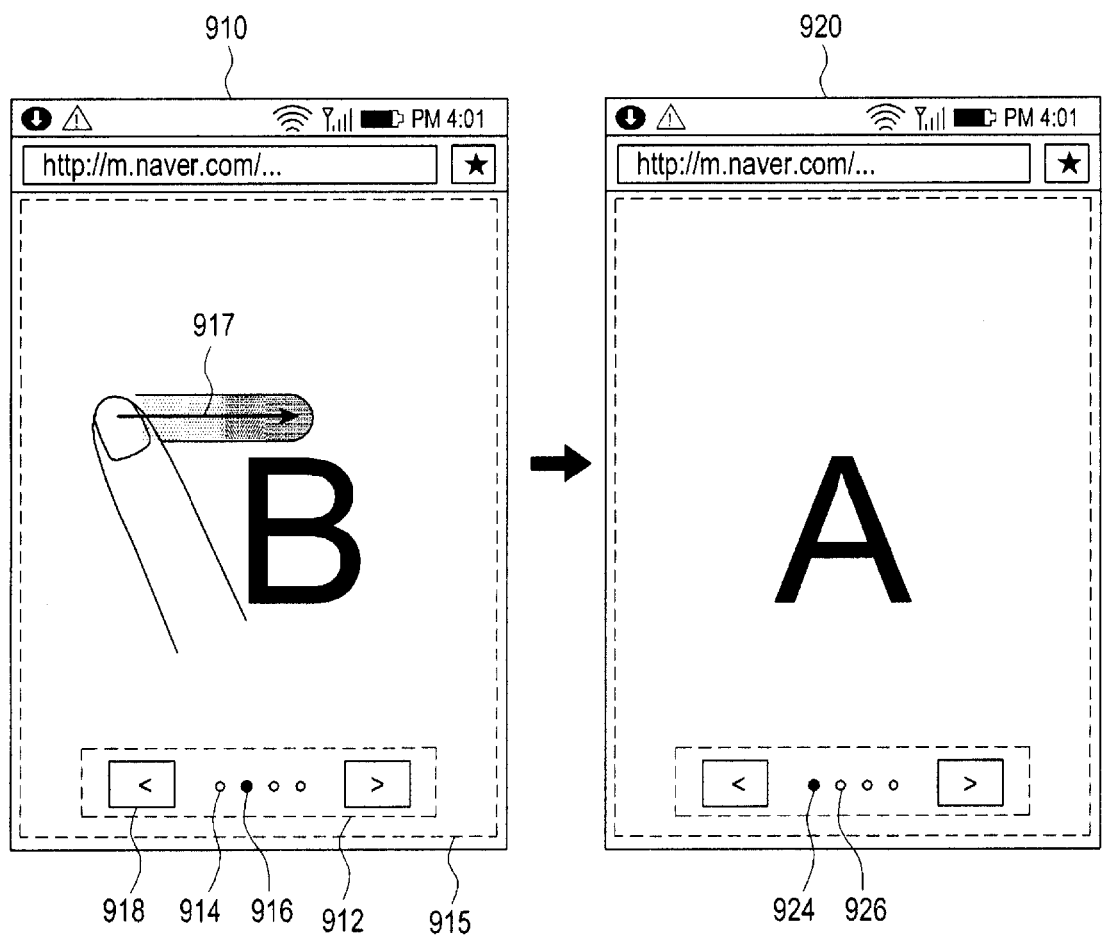
FIG. 9 illustrates another exemplary switching from one Web page to another on a screen according to the aspect of the present invention.

Similarly, upon sensing the touch gesture 917 made to in a right direction on a Web page 915 displayed on a screen 910 in FIG. 9, the UI providing apparatus may identify the hyperlink (or position information) of a previous (i.e., (n−1)$^{th}$) Web page mapped to the right-directional touch gesture 917 based on the paging information configuration illustrated in Table 1. Then the UI providing apparatus may receive the (n−1)$^{th}$ Web page using the hyperlink from the Web server and display the received (n−1)$^{th}$ Web page on a screen 920.

Therefore, since a response to the touch gesture 917 may have the same result that can be achieved by clicking or tapping on an object 914 adjacent to an object 916 representing the current Web page, there is no need for enlarging the page information area 912 on the screen 910 to click or tap on the object 914. An object 924 may be an index indicating the $(n-1)^{th}$ Web page and an object 926 may be an index indicating the $n^{th}$ Web page.

Figure 10:
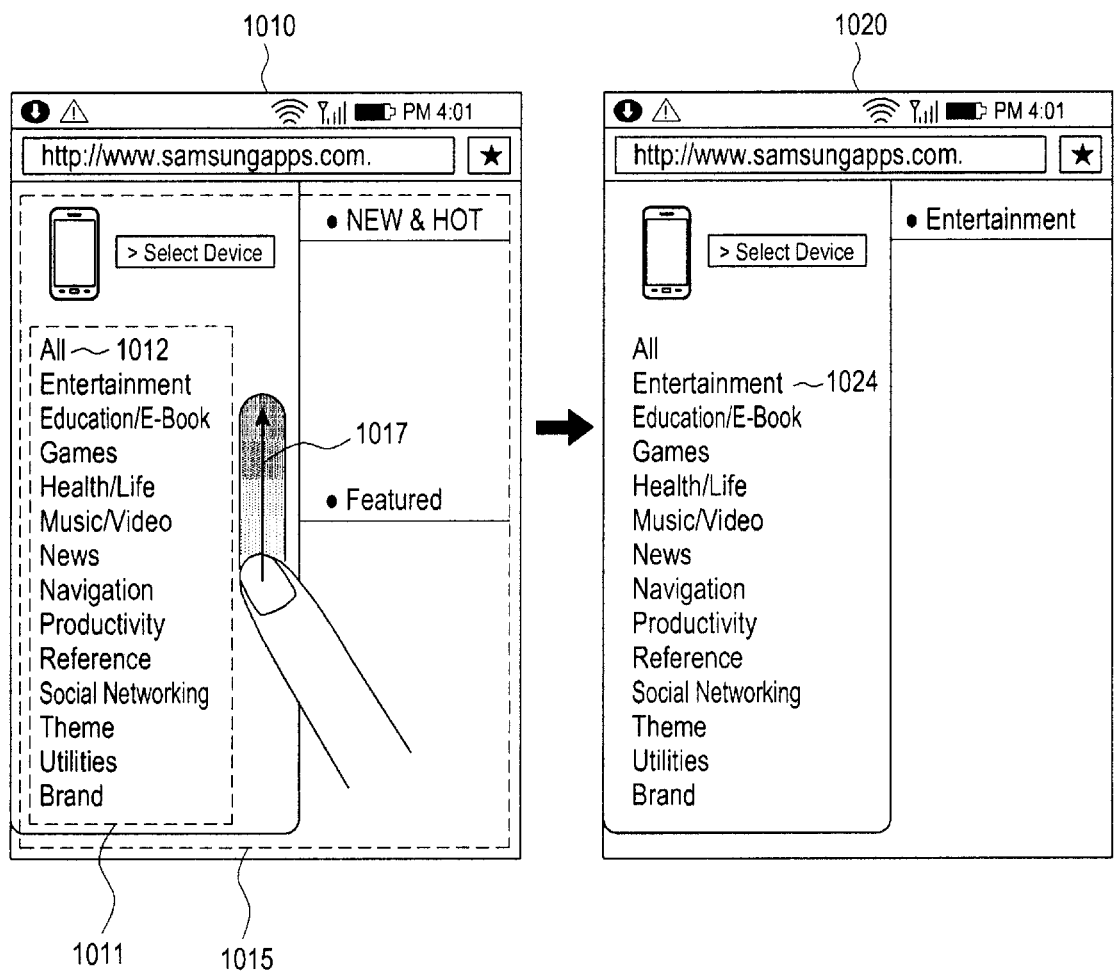
FIG. 10 illustrates an exemplary switching from one Web page to another on a screen according to another aspect of the present invention.

Similarly, upon sensing a touch gesture 1017 made in an upward direction on a Web page 1015 displayed on a screen 1010 in FIG. 10, the UI providing apparatus may identify a hyperlink (or position information) of the next or subsequent (i.e., $(n+1)^{th}$) Web page mapped to an upward touch gesture 1017 based on the paging information configuration illustrated in Table 2. Then, the UI providing apparatus may receive the $(n+1)^{th}$ Web page from the Web server using the hyperlink and display the received $(n+1)^{th}$ Web page on a screen 1020. An object 1012 included in a paging interface 1011 on the screen 1010 may be an index indicating content displayed on the right-hand side of the Web page 1015 on the screen 1010. An object 1024 may be an index indicating content displayed on the right-hand side of the screen 1020. That is, the result from switching the screen 1010 to the screen 1020 may be the same as can be achieved by clicking or tapping on the object 1024 just under the object 1012.

However, the UI providing apparatus, in accordance with the principles of the invention, can eliminate the inconvenience involved in conventional UI in requiring accurate touching of object 1024 in the paging interface 1011. Hence, owing to the directional determination of touch gesture 1017, significant reduction in potential mistakes in selecting unintended objects is achieved.

Figure 11:
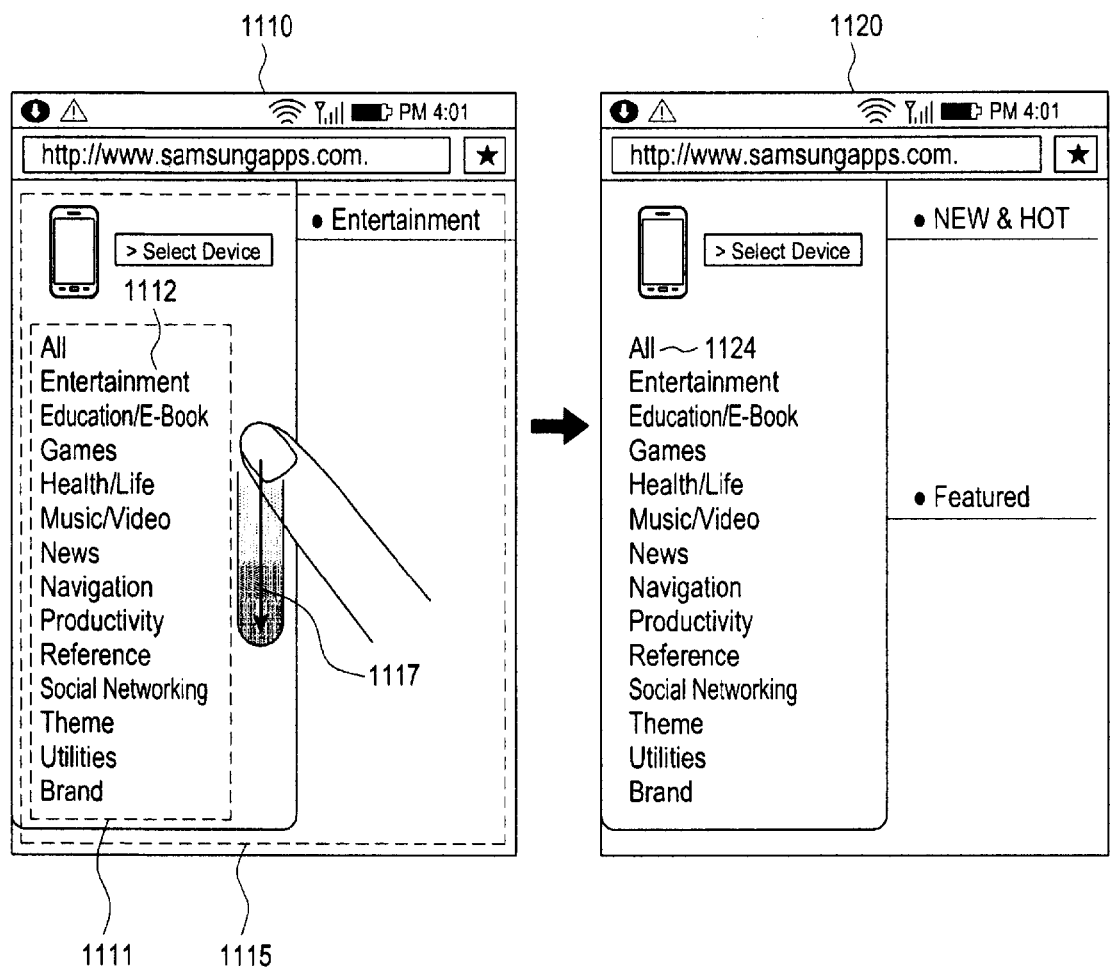
FIG. 11 illustrates another exemplary switching from one Web page to another on a screen according to another aspect of the present invention.

As a further example, upon sensing a touch gesture 1117 made in a downward direction on a Web page 1115 displayed on a screen 1110 in FIG. 11, the UI providing apparatus may identify a hyperlink (or position information) of a previous (i.e., $(n-1)^{th}$) Web page mapped to the downward touch gesture 1117 based on the paging information configured as illustrated in Table 2. In this case, the UI providing apparatus may receive the $(n-1)^{th}$ Web page from the Web server using the hyperlink and display the received $(n-1)^{th}$ Web page on screen 1120. An object 1112 included in a paging interface 1112 on the screen 1110 may be an index indicating content displayed on the right-hand side of the Web page 1115 on the screen 1110. An object 1124 may be an index indicating content displayed on the right-hand side of the screen 1120.

In Table 1 and Table 2, and the embodiments of the present invention represented in FIGS. 8 to 11, mapping information that maps the direction of a gesture to at least one of a previous Web page and a next Web page to a current Web page may be set by the UI providing apparatus or modified by user manipulation.

In addition, while the operation of determining a hyperlink mapped to a gesture direction based on paging information illustrated in Table 1 or Table 2, at least a part of the paging information may be omitted or changed. For example, the operation of storing paging information by determining a hyperlink included in the $n^{th}$ Web page, mapping a gesture direction to the determined hyperlink, and storing the mapping information in the memory may be omitted at least partially. The UI providing apparatus may store, as the paging information in the memory, information indicating a hyperlink linked to a Web page corresponding to a touch direction among a previous Web page and a next Web page to the current Web page. That is, the paging information stored in the memory does not specify a hyperlink determined from the $n^{th}$ Web page. Rather, the paging information may be mapping information between a gesture direction and a hyperlink detection command indicating a hyperlink to be determined. For example, after receiving a touch gesture 817 made in a left direction in FIG. 8, the UI providing apparatus may determine a hyperlink detection command indicating a hyperlink linked to the $(n+1)^{th}$ page mapped to the touch gesture. Then, the UI providing apparatus may determine a hyperlink linked to the object 816 adjacent to the right of the object 814 representing the current Web page. The UI providing apparatus may display the $(n+1)^{th}$ Web page indicated by the determined hyperlink.

In step 1235, the UI providing apparatus may update the paging information in the memory. For example, the UI providing apparatus may switch the $n^{th}$ Web page of the screen 810 to the $(n+1)^{th}$ Web page of the screen 820 in FIG. 8, using the paging information illustrated in Table 1, stored in the memory. The moment the $(n+1)^{th}$ Web page is displayed on the screen 820 or before or after the $(n+1)^{th}$ Web page is displayed on the screen 820, the UI providing apparatus may update the paging information of Table 1. That is, the updated paging information may include updated mapping information indicating Web pages to be switched to in response to the direction of touch gestures on the $(n+1)^{th}$ Web page of the screen 820. For example, the updated mapping information may indicate that a left direction is mapped to the hyperlink of an $(n+2)^{th}$ Web page following the displayed $(n+1)^{th}$ Web page and a right direction is mapped to the hyperlink of the $n^{th}$ Web page, which is now previous (i.e., $(n-1)^{th}$) to the displayed $(n+1)^{th}$ Web page.

In addition, the UI providing apparatus may update a Web page at the moment when the Web page is displayed on a screen or at a predetermined interval from the time of reception of the Web page from the Web server. The UI providing apparatus may handle a change in the source (or code) of a paging interface caused by a layout of Web pages, etc. changed in the Web server by periodic updates of a Web page.

A UI providing apparatus according to an embodiment of the present invention will be described below with reference to FIG. 14.

Figure 14:
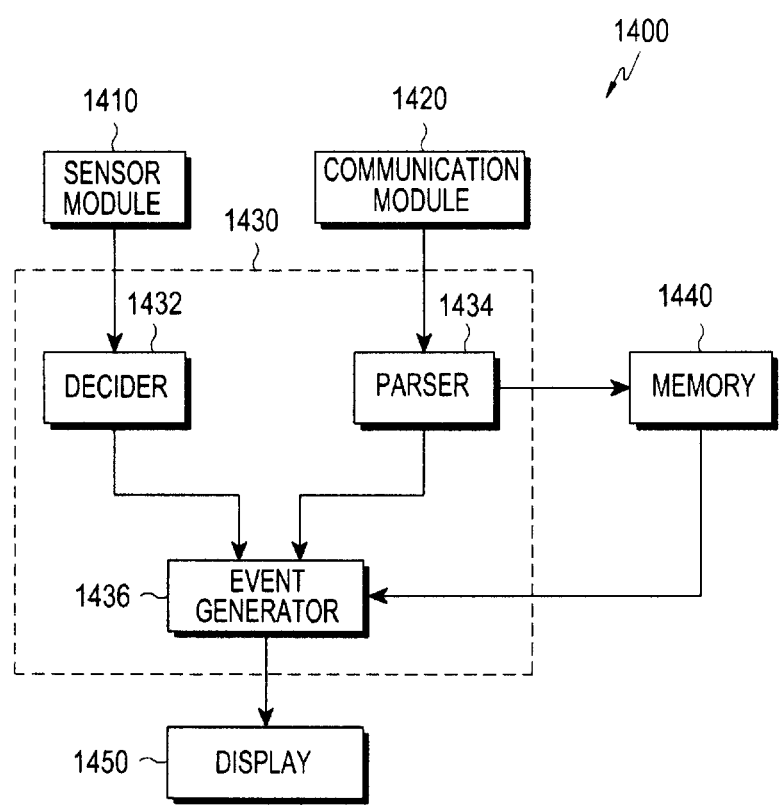
FIG. 14 is a block diagram of an apparatus for providing a user interface according to an embodiment of the present invention.

Referring to FIG. 14, a UI providing apparatus 1400 may include a controller 1430 for controlling display of an $n^{th}$ Web page including one or more hyperlinks on a screen and sensing the direction of a gesture. Upon sensing the gesture direction, the controller 1430 may control determination of a hyperlink indicating one of a previous Web page and a next Web page to the $n^{th}$ Web page from among the one or more hyperlinks and may control display on the screen of a Web page indicated by the determined hyperlink.

In addition, the UI providing apparatus 1400 may include the controller 1430 for controlling display of an $n^{th}$ Web page including a first object representing an index of the $n^{th}$ Web page and a second object linked to a hyperlink indicating one of a previous Web page and a next Web page to the $n^{th}$ Web page on the screen and may sense a gesture direction. Upon sensing the gesture direction, the controller 1430 may determine a hyperlink based on an arrangement sequence of the first and second objects and the direction of the gesture and may control the display of the Web page indicated by the determined hyperlink.

The UI providing apparatus 1400 may include a memory 1440 for storing paging information about the $n^{th}$ Web page displayed on the screen. The UI providing apparatus may include the controller 1430 for sensing the direction of a gesture and, upon sensing the direction of the gesture, controlling the display on the screen of one of a previous Web page and a next Web page to the $n^{th}$ Web page based on the paging information.

The UI providing apparatus 1400 may further include a sensor unit 1410, a communication module 1420, and/or a display 1450.

The communication module 1420 may receive data of the $n^{th}$ Web page from a Web server (not shown). The communication module 1420 may receive Web (or WAP) page data wirelessly or by wire over the Internet. The Web server may generate data of a plurality of Web pages by processing multimedia data according to a screen size or resolution set in preferences of the UI providing apparatus 1400 (or set in a User Agent (UA) module). Accordingly, in spite of the same multimedia data, the data of the plurality of Web pages may be different according to the types of UI providing apparatuses. The Web server may transmit the data of at least one Web page to the communication module 1420 according to a request signal received from the communication module 1420.

The display 1450 may include a display module such as a Cathode Ray Tube (CRT), a Liquid Crystal Display (LCD), a Plasma Display Panel (PDP), a Light Emitting Diode (LED), a Light Emitting Polymer (LEP) display, or an Organic Light Emitting Diode (OLED).

The sensor unit 1410 may sense a gesture, generate gesture data based on the sensed gesture, and transmit the gesture data to the controller 1430. A decider 1432 of the controller 1430 may sense the direction of the gesture from the gesture data received from the sensor unit 1410. The sensor unit 1410 may include a touch sensor, a sensor for sensing an input of a button, a motion sensor, or a module for receiving a signal carrying direction information.

The sensor unit 1410 may include a touch sensor for sensing a touch gesture. The sensor unit 1410 may transmit data of the sensed gesture to the decider 1432 of the controller 1430. The display 1450 and the sensor unit 1410 may be combined into a touch screen. The touch sensor may be provided on the frontal or rear surface of the screen in the display module or at the same position of the screen. A capacitive, resistive, infrared, or surface acoustic wave touch sensor may be used as the touch sensor. It is well known that the touch sensor may be provided on the frontal or rear surface of the display.

The sensor unit 1410 may include a sensor for sensing an operation of a directional key or button (not shown) included in the UI providing apparatus 1400. For example, a Web page may be switched to another Web page based on paging information in response to the manipulation of a directional key or button, rather than in response to a touch gesture on the screen of the UI providing apparatus 1400. The sensor unit 1410 may be a module for receiving an operation signal of a directional key or button (i.e. a signal carrying direction information) of a remote controller (not shown) that is separately configured from the UI providing apparatus 1400 and interacts with the UI providing apparatus 1400. The remote controller may include directional keys (or buttons) or a touch screen for receiving a directional touch gesture. The remote controller may convert input data of a directional key of the remote controller or input data of a touch gesture received through the touch screen into a signal carrying direction information. The remote controller may transmit the signal including the direction information to the UI providing apparatus 1400. The sensor unit 1410 may decode the direction information in the signal received from the remote controller and transmit the decoded direction information to the decider 1432 of the controller 1430.

Figure 8:
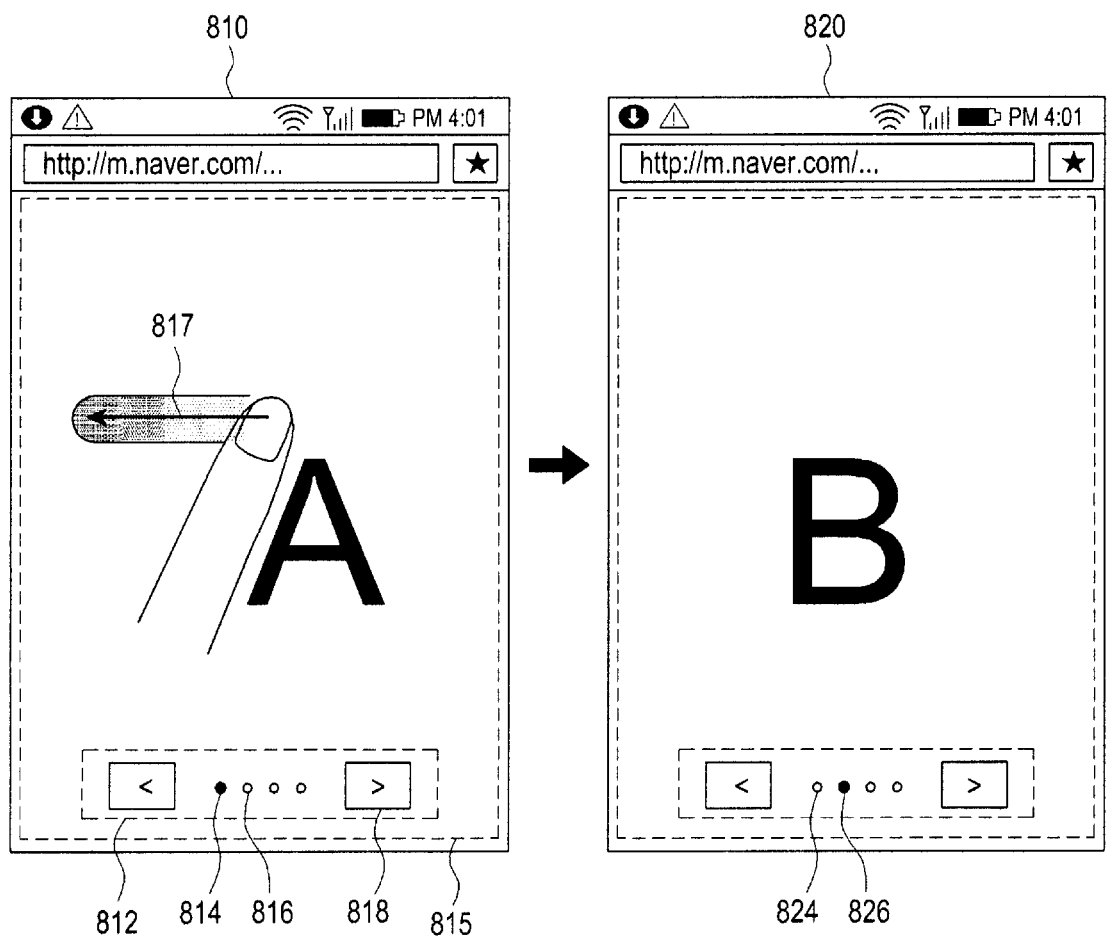
FIG. 8 illustrates an exemplary switching from one Web page to another on a screen according to an aspect of the present invention.

The sensor unit 1410 may include a motion sensor for sensing a motion (or inclination) of the UI providing apparatus 1400 or a motion (or inclination) of a terminal including the UI providing apparatus 1400 (or a screen controlled by the UI providing apparatus 1400). For example, the motion sensor may include at least one of an acceleration sensor, a gyro sensor, an inclination sensor, and a two-dimensional (2D) or three-dimensional (3D) optical sensor. When the terminal including the UI providing apparatus 1400 is inclined to the left or to the right, the sensor unit 1410 may sense the inclination or acceleration applied in the left or the right direction by a user and transmit sensed motion data to the decider 1432 of the controller 1430. For example, after the terminal is placed in such a manner that the screen 810 of FIG. 8 is displayed almost in parallel to the ground or the screen 810 is kept stationary for a predetermined time irrespective of the position state of the screen 810, the left side of the screen 810 may be inclined toward the ground by a user's gesture. Herein, the UI providing apparatus 1400 senses the motion event of the terminal's inclination to the left for a specific time and then switches from the currently displayed $n^{th}$ Web page to the $(n+1)^{th}$ Web page based on the paging information. The controller 1430 may determine the inclined direction (or motion direction) of the terminal including the UI providing apparatus 1400 from the sensed motion data received from the sensor 1410. That is, the controller 1430 may generate or use paging information indicating at least one hyperlink (or a command to determine at least one hyperlink) mapped to a motion direction of the terminal, in order to switch to one of a previous Web page and a next Web pages. The controller 1430 may determine the inclined direction (or movement direction) of the terminal including the UI providing apparatus 1400 from the motion data received from the sensor unit 1410. That is, the controller 1430 may generate or use paging information indicating at least one hyperlink (or hyperlink detection command) mapped to a direction of the terminal's motion in order to switch from the current Web page to one of a previous and a next page.

Although, FIG. 8 and FIG. 9 illustrate an example wherein a next or a previous Web page are displayed based on a direction of a gesture, wherein the gesture is implemented with a single finger. However, it would be appreciated that if the gesture is made with two fingers, for example, then a previous or a next Web page, 2 pages removed from the currently displayed Web page may be displayed. Similarly, if the gesture is implemented with three fingers, then a previous or a next Web page, 3 pages removed from the currently displayed Web page may be displayed.

The memory 1440 may store paging information received from a parser 1434 of the controller 1430. For example, the paging information stored in the memory 1440 may be configured as illustrated in Table 1 or Table 2. The memory 1440 may be configured with various types of memories including volatile or non-volatile memories or hard disks.

The controller 1430 may include the decider 1432, the parser 1434, and/or an event generator 1436. The controller 1430 may be configured with at least one processor and/or software module.

The parser 1434 may parse the source (or code) of the $n^{th}$ Web page based on data of the $n^{th}$ Web page received from the communication module 1420. The operation for parsing the source of the $n^{th}$ Web page has been described before with reference to FIG. 13 and thus its detailed description need not be again provided herein. The parser 1434 may store paging information detected from the source code of the $n^{th}$ Web page in the memory 1440. In addition, the parser 1434 may transmit information to be displayed on the screen in the source of the $n^{th}$ Web page to the event generator 1436. At least a part of the functions of the parser 1434 may be implemented in a software module of a Web browser. The source of the $n^{th}$ Web page may include HTML, CSS, images, and javascript and the Web browser may provide a function of collecting Web page sources and displaying them on a screen. The software module that implements a part of the functions of the parser 1434 may detect paging information using a specific pattern of objects or hyperlinks by parsing a paging interface included in the source.

The decider 1432 may determine (or sense) the direction of a gesture by analyzing data of the gesture received from the sensor unit 1410. The decider 1432 may determine the direction of the gesture made by the user by processing the received gesture data regarding, for example, a touch gesture, an input of a directional button (or key), and a remote controller signal including direction information, or a motion of the terminal. The decider 1432 may transmit information indicating the determined gesture direction to the event generator 1436.

The event generator 1436 may control display of the n$^{th}$ Web page on the screen by transmitting the information received from the parser 1434 to the display 1450. In addition, upon receipt of the information indicating the gesture direction from the decider 1432, the event generator 1436 may control display of one of a previous page and a next page to the n$^{th}$ Web page on the screen based on the paging information stored in the memory 1440. That is, the event generator 1440 may control reception of Web page data corresponding to the gesture direction from the communication module 1420, referring to a hyperlink indicating one of a previous Web page and a next Web page to the nth Web page according to the paging information. The parser 1434 and the event generator 1436 may process the received Web page data and thus one of a previous Web page and a next Web page to the n$^{th}$ Web page may be displayed on the display 1450. In this manner, the controller 1430 can automatically detect a paging interface and determine the direction of a gesture from a user's intuitive manipulation, thus providing an Internet service efficiently.

In addition, the controller 1430 may control storage of information required to display at least one of a previous Web page and a next Web page to the n$^{th}$ Web page in the memory 1440, before the gesture direction is sensed. Upon receipt of the data of the n$^{th}$ Web page as the current Web page from the communication module 1420, the controller 1430 may receive the data of at least one of a previous page and a next web page to the n$^{th}$ Web page, together with the data of the n$^{th}$ Web page. In this case, when the event generator 1436 is to switch one screen to another screen according to the gesture direction, it may receive display information about a Web page to be switched to from the memory 1440.

Figure 15:
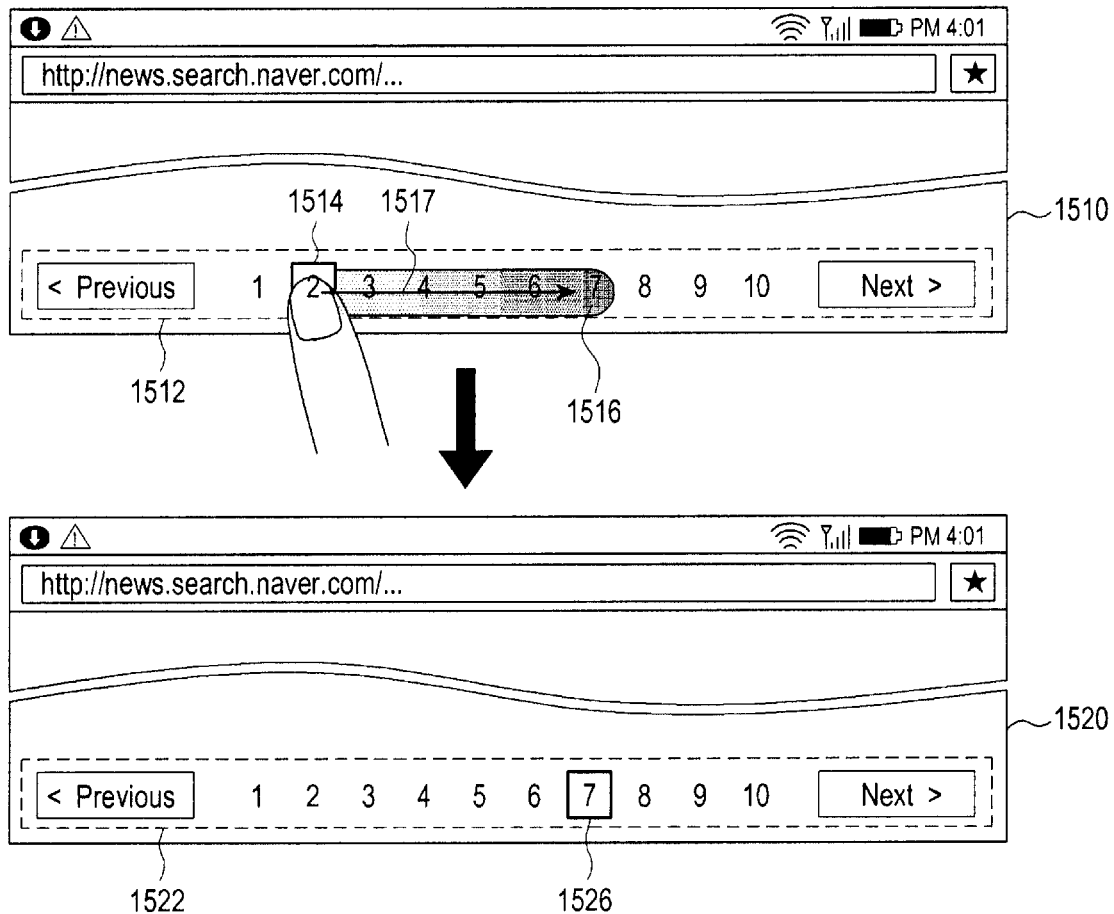
FIG. 15 illustrates an exemplary switching from one Web page to another Web page according to a further aspect of the present invention.

While it has been described that the region of a Web page in which to receive a touch gesture is not related to the region of objects in a paging interface in FIGS. 8 to 11, a touch gesture 1517 may be made in a paging interface 1512 of a Web page displayed on a screen 1510 in FIG. 15. In the same manner as the n$^{th}$ Web page of the screen 910 is switched to the (n−1)$^{th}$ Web page of the screen 920 in FIG. 9, the n$^{th}$ Web page indicated by index 2 (an object 1514) may be switched to the (n−1)$^{th}$ Web page indicated by index 1 on the screen 1510 in FIG. 15.

According to another aspect of the present invention, the UI providing apparatus 1400 may include the controller 1430 for controlling display of an n$^{th}$ Web page including a first object indicating the index of the n$^{th}$ Web page and at least one object linked to a hyperlink. The UI providing apparatus 1400 may include the sensor 1410 unit for receiving a touch gesture on the screen.

If the movement trace of the touch gesture is overlapped with at least a part of the region of the first object, the controller 1430 may determine a hyperlink linked to a last object from among one or more objects and may control display of a Web page indicated by the determined hyperlink on the screen. (see index 7, screen 1510, FIG. 15).

The last object refers to an object having at least a part of the latest region overlapped with the movement trace of the touch gesture in a time domain. For example, upon receipt of the touch gesture 1517 in the paging interface (or the region of objects included in the paging interface) in FIG. 15, the controller 1430 of the UI providing apparatus 1400 may determine whether the movement trace of the touch gesture 1517 includes at least a part of the region of the object 1514 representing the current Web page, (i.e., Web page, index 2).

The region of the object 1514 may be identical to a region selected or activated by a tapping or clicking gesture on the object 1514. If the movement trace of the touch gesture 1517 includes at least a part of the region of the object 1514 representing the current Web page, (i.e., Web page 2), the controller 1430 may determine a hyperlink linked to a last object 1516 having a partial region overlapped with the movement trace of the touch gesture 1517 in the time domain. The controller 1430 may receive a Web page indicated by index 7 corresponding to the hyperlink linked to the last object 1516 from the Web server and may control display of the Web page indicated by index 7 (the object 1526) in a paging interface 1522 on a screen 1520.

If the movement trace of the touch gesture 1517 does not include the region of the object 1514 representing the current Web page, Web page 2, the controller 1430 may control display of the Web page indicated by index 1 in substitute for the Web page indicated by index 2 according to the direction of the touch gesture 1517 based on the paging information. That is, a touch gesture that triggers switching from the screen 1510 to the screen 1520 may be a flick or a drag and the movement trace of the touch gesture may include at least a part of the region of index 2 (the object 1514), and index 7 (the object 1516) may be the last object in accordance with an embodiment of the present invention. For example, the movement trace of the touch gesture 1517 may be overlapped with at least a part of each of the regions of index 2 (the object 1514), index 3, index 4, index 5, index 6, and index 7 (the object 1516) in time order in FIG. 15.

In addition, the touch gesture may be a drag and the movement trace of the touch gesture may be overlapped sequentially with at least a part of each of the regions of index 2, index 3, index 4, index 5, index 6, and index 7. Because the trace of the touch gesture includes a part of the region of index 2 indicating the current Web page and has a part of the region of index 7 as the last object, the UI providing apparatus 1440 may create the same response as to the touch gesture 1517. In addition, while the region of at least one object overlapped with the movement trace of the touch gesture is being touched, a visual feedback indicating the touch on the region of the object may be provided.

In this manner, the UI providing apparatus 1400 may provide user convenience so that the movement of a touch gesture may accurately reach up to the user-intended last object, passing through an object representing a current Web page. The UI providing apparatus 1400 may also sense a touch gesture such as a drag or a flick on a paging interface occupying a limited area and may control fast switching from the current Web page to a user-designated Web page.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Further, a microprocessor or a microcomputer may be used, instead of the afore-described controller 1430 and may operate according to the flowcharts illustrated in FIGS. 12 and 13 and the embodiment of the present invention described with reference to FIG. 14 or 15. Those skilled in the art will understand that the flowcharts illustrated in FIGS. 12 and 13 and the embodiment of the present invention described with reference to FIG. 14 or 15 may be programmed in software, hardware, or a combination of both. The UI providing apparatus may download the program of the flowcharts illustrated in FIGS. 12 and 13 and the embodiment of the present invention described with reference to FIG. 514 or 15 from a server or a computer through a communication network.

As is apparent from the above description of the present invention, because a page previous to, or next to, a current Web page is displayed based on a sensed gesture direction, the present invention can reduce a user's manipulation mistakes and provide user convenience.

In another aspect, after the gesture is sensed, a screen is switched to a Web page indicated by a hyperlink linked to a last object of the movement trace of the gesture. Therefore, the present invention enables accurate, fast use.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method for providing a user interface of a portable terminal, comprising:
    storing paging information regarding an nth Web page received from a Web server and displayed on a screen, the paging information detected by parsing the nth Web Page;
    displaying on a screen the nth Web page with an object that permits navigation to another Web page that is previous or subsequent to the nth Web page;
    sensing a motion by a user over the portable terminal;
    determining a direction of the motion; and
    displaying another Web page that is previous or subsequent to the nth Web page in accordance with the direction of the motion,
    wherein the nth Web page parsing comprises: determining whether the nth Web page includes a first object and a second object, the first object being an index indicating the nth Web page and the second object being an index adjacent to the first object, linked to a first hyperlink indicating one of the previous Web page and the next Web page to the nth Web page, the nth Web page and at least one of the previous Web page and the next Web page to the nth Web page having the same domain, and the at least one of the previous Web page and the next Web page to the nth Web page includes a third object and a fourth object, the third object being an index indicating the at least one of the previous Web page and the next Web page to the nth Web page and the fourth object being an index adjacent to the third object, linked to a second hyperlink indicating the nth Web page.

2. The method of claim 1, wherein the nth Web page parsing comprises determining whether an Identifier (ID) of at least one of a class and a display attribute represents paging information in a source code of the nth Web page.

3. The method of claim 1, wherein the displaying comprises:
    displaying one of the previous Web page and the next Web page by as many Web pages as a number of fingers that have made the motion, on the screen.

4. The method of claim 1, wherein the paging information includes at least one hyperlink indicating at least one of the previous Web page and the Web next page to the displayed nth Web page.

5. The method of claim 4, wherein the paging information includes mapping information indicating the at least one hyperlink corresponding to the motion direction.

6. The method of claim 1, wherein the paging information is generated according to an arrangement sequence of first and second objects on the screen, the first object being an index indicating the nth Web page, and the second object being an index linked to a hyperlink indicating the one of the previous Web page and the next Web page to the nth Web page.

7. The method of claim 4, wherein the motion direction sensing comprises:
    sensing the direction of the motion irrespective of a region of an object linked to the at least one hyperlink in a region in which the nth Web page is displayed.

8. An apparatus for providing a user interface for an Internet service, comprising:
    a memory storing paging information regarding an nth Web page received from a server and displayed on a screen; and
    a controller to:
        parse the nth Web page to detect the paging information,
        display the nth Web page and at least one object on a screen, the at least one object permitting navigation to another Web page that is previous or subsequent to the nth Web page,
        sensing a motion by a user over the apparatus, in which the motion is sensed on a position of the nth Web page,
        determine a direction of the motion,
        identify a hyperlink to the Web page that is previous or subsequent to the nth Web page such that the hyperlink corresponds to the direction of the motion on the screen, and
        display the Web page that is previous or subsequent to the nth Web as indicated by the hyperlink,
    wherein the controller further determines whether the nth Web page includes a first object and a second object, the first object being an index indicating the nth Web page and the second object being an index adjacent to the first object, linked to a first hyperlink indicating one of the previous Web page and the next Web page to the nth Web page, the nth Web page and at least one of the previous Web page and the next Web page to the nth Web page have the same domain, and the at least one of the previous Web page and the next Web page to the nth Web page includes a third object and a fourth object, the third object being an index indicating the at least one of the previous Web page and the next web pages to the nth Web page and the fourth object being an index adjacent to the third object, linked to a second hyperlink indicating the nth Web page.

9. The apparatus of claim 8, wherein the controller determines whether an Identifier (ID) of at least one of a class and a display attribute is paging in a source code of the nth Web page.

10. The apparatus of claim 8, wherein the paging information includes at least one hyperlink indicating at least one of the previous Web page and the next Web pages to the displayed nth Web page.

11. The apparatus of claim 10, wherein the paging information includes mapping information indicating the at least one hyperlink corresponding to the motion direction.

12. The apparatus of claim 8, wherein the paging information is generated according to an arrangement sequence of first and second objects on the screen, the first object being an index indicating the nth Web page, and the second object being an index linked to a hyperlink indicating the one of the previous Web page and the next Web page to the nth Web page.

13. A method, operable in a processor, for providing a user interface for an Internet service, comprising:
displaying an nth Web page received from a Web server and at least one object on a screen, the at least one object permitting navigation to another Web page different than the nth Web page;
parsing the nth Web page to detect paging information;
sensing a motion by a user over the screen, in which the motion is sensed on a position of the nth Web page;
determining a direction of the motion;
identifying a hyperlink to another Web page different than the nth Web page such that the hyperlink corresponds to the direction of the motion on the screen; and
displaying the Web page different than the nth Web page as indicated by the hyperlink,
wherein the nth Web page parsing comprises: determining whether the nth Web page includes a first object and a second object, the first object being an index indicating the nth Web page and the second object being an index adjacent to the first object, linked to a first hyperlink indicating one of a previous Web page and a next Web page to the nth Web page, the nth Web page and at least one of the previous Web page and the next Web page to the nth Web page having the same domain, and the at least one of the previous Web page and the next Web page to the nth Web page includes a third object and a fourth object, the third object being an index indicating the at least one of the previous Web page and the next Web page to the nth Web page and the fourth object being an index adjacent to the third object, linked to a second hyperlink indicating the nth Web page.

14. An apparatus for providing a user interface for an Internet service, comprising:
a controller to:
display an nth Web page received from a Web server with an object that permits navigation to another Web page that is previous or subsequent to the nth Web page;
parse the nth Web page to detect paging information;
detect a motion by a user over the apparatus, the motion being sensed on a position of the nth Web page; and
display another Web page that is previous or subsequent to the nth Web page in accordance with a direction of the motion,
wherein the controller further determines whether the nth Web page includes a first object and a second object, the first object being an index indicating the nth Web page and the second object being an index adjacent to the first object, linked to a first hyperlink indicating one of the previous Web page and the next Web page to the nth Web page, the nth Web page and at least one of the previous Web page and the next Web page to the nth Web page have the same domain, and at least one of the previous Web page and the next Web page to the nth Web page includes a third object and a fourth object, the third object being an index indicating the at least one of the previous Web page and the next web pages to the nth Web page and the fourth object being an index adjacent to the third object, linked to a second hyperlink indicating the nth Web page.

15. A method for providing a user interface for an Internet service, comprising:
displaying on a screen an nth Web page received from a Web server including a first object associated with an index of the nth Web page and a second object associated with a hyperlink to a Web page that is previous or subsequent to the nth Web page;
parsing the nth Web page to detect paging information;
sensing a motion by a user over the screen on a position of the nth Web page;
determining a direction of the motion;
determining a hyperlink that corresponds to the direction of the motion; and
displaying on the screen the Web page that is previous or subsequent to the nth Web page as indicated by the hyperlink,
wherein the nth Web page parsing comprises: determining whether the nth Web page includes a first object and a second object, the first object being an index indicating the nth Web page and the second object being an index adjacent to the first object, linked to a first hyperlink indicating one of the previous Web page and the next Web page to the nth Web page, the nth Web page and at least one of the previous Web page and the next Web page to the nth Web page having the same domain, and at least one of the previous Web page and the next Web page to the nth Web page includes a third object and a fourth object, the third object being an index indicating the at least one of the previous Web page and the next Web page to the nth Web page and the fourth object being an index adjacent to the third object, linked to a second hyperlink indicating the nth Web page.

16. An apparatus for providing a user interface for an Internet service, comprising:
a controller to:
display an nth Web page received from a Web server including a first object representing an index of the nth Web page and a second object linked to a hyperlink indicating one of a previous Web page and a next Web page to the nth Web page on a screen;
parsing the nth Web page to detect paging information;
sense a motion by a user over the apparatus, the motion being sensed on a position of the nth Web page different than that of the first object and second object displayed on the nth Web page;
determining a direction of the motion;

determining a hyperlink according to an arrangement sequence of the first and second objects and the determined direction of the motion; and displaying on the screen, a Web page indicated by the determined hyperlink, wherein the controller further determines whether the nth Web page includes a first object and a second object, the first object being an index indicating the nth Web page and the second object being an index adjacent to the first object, linked to a first hyperlink indicating one of the previous Web page and the next Web page to the nth Web page, the nth Web page and at least one of the previous Web page and the next Web page to the nth Web page have the same domain, and at least one of the previous Web page and the next Web page to the nth Web page includes a third object and a fourth object, the third object being an index indicating the at least one of the previous Web page and the next web pages to the nth Web page and the fourth object being an index adjacent to the third object, linked to a second hyperlink indicating the nth Web page.

17. A system for providing a user interface for an Internet service, comprising:

a remote control for converting a motion into a wireless signal and transmitting the signal to an apparatus, the wireless signal carrying direction information, the apparatus comprising at least one processor to:

display a Web page received from a Web server including at least one hyperlink on a screen;

parse the Web page to detect paging information;

analyze the direction information transmitted by the remote control;

detect a motion by a user over the apparatus from the direction information that is at a position on the display different than the at least one hyperlink displayed on the Web page;

determine a direction of the motion; and display a different Web page indicated by a given hyperlink associated with the direction of the motion, wherein the at least one processor further determines whether the Web page includes a first object and a second object, the first object being an index indicating the Web page and the second object being an index adjacent to the first object, linked to a first hyperlink indicating one of a previous Web page and a next Web page to the Web page, the Web page and at least one of the previous Web page and the next Web page to the Web page have the same domain, and the at least one of the previous Web page and the next Web page to the Web page includes a third object and a fourth object, the third object being an index indicating the at least one of the previous Web page and the next web pages to the Web page and the fourth object being an index adjacent to the third object, linked to a second hyperlink indicating the Web page.

* * * * *

UNITED STATES PATENT AND TRADEMARK OFFICE
CERTIFICATE OF CORRECTION

| | | |
|---|---|---|
| PATENT NO. | : 9,189,564 B2 | Page 1 of 1 |
| APPLICATION NO. | : 13/529214 | |
| DATED | : November 17, 2015 | |
| INVENTOR(S) | : Sang-Heon Kim et al. | |

It is certified that error appears in the above-identified patent and that said Letters Patent is hereby corrected as shown below:

Claims
Column 20, Claim 8, Line 58 should read as follows:
--...nth Web page as...--

Signed and Sealed this
First Day of March, 2016

Michelle K. Lee
*Director of the United States Patent and Trademark Office*